United States Patent
Goto et al.

(10) Patent No.: US 6,565,072 B2
(45) Date of Patent: May 20, 2003

(54) DAMPING ACTUATOR AND ACTIVE VIBRATION DAMPING DEVICE EQUIPPED WITH THE ACTUATOR

(75) Inventors: Katsuhiro Goto, Inuyama (JP); Yoshihiko Hagino, Inuyama (JP)

(73) Assignee: Tokai Rubber Industries, Ltd. (JP)

( * ) Notice: Subject to any disclaimer, the term of this patent is extended or adjusted under 35 U.S.C. 154(b) by 0 days.

(21) Appl. No.: 09/963,224

(22) Filed: Sep. 26, 2001

(65) Prior Publication Data

US 2002/0036372 A1 Mar. 28, 2002

(30) Foreign Application Priority Data

Sep. 28, 2000 (JP) ......................................... 2000-297404

(51) Int. Cl.⁷ .................. F16F 13/00; F16F 15/00; F16F 5/00; F16F 9/00; F16M 11/00
(52) U.S. Cl. ............................. 267/140.14; 267/140.15
(58) Field of Search ........................ 267/140.14, 140.15, 267/140.13, 219, 140.11, 292

(56) References Cited

U.S. PATENT DOCUMENTS

| | | | | |
|---|---|---|---|---|
| 4,432,441 A | * | 2/1984 | Kurokawa ................. 188/267 |
| 4,650,170 A | * | 3/1987 | Fukushima ............. 267/140.14 |
| 4,693,455 A | | 9/1987 | Andra ...................... 267/140.1 |
| 5,356,123 A | * | 10/1994 | Hamada et al. ......... 267/140.14 |
| 5,366,211 A | * | 11/1994 | Hamada et al. ......... 267/140.14 |
| 5,427,362 A | | 6/1995 | Schilling et al. ....... 267/140.14 |
| 5,520,375 A | * | 5/1996 | Leibach et al. ......... 267/140.14 |
| 5,529,295 A | | 6/1996 | Leibach et al. ......... 267/140.15 |
| 5,653,427 A | * | 8/1997 | Matsuda et al. ........ 267/140.14 |
| 5,718,417 A | | 2/1998 | Aoki ....................... 267/140.14 |
| 5,718,418 A | | 2/1998 | Gugsch .................. 267/140.14 |
| 5,779,231 A | * | 7/1998 | Okazaki et al. ........ 267/140.14 |
| 5,820,113 A | * | 10/1998 | Laughlin ................ 267/140.15 |
| 5,961,104 A | * | 10/1999 | Gennesseaux .......... 267/140.14 |
| 6,059,275 A | * | 5/2000 | Muramatsu ............. 267/140.14 |
| 6,105,943 A | | 8/2000 | Nagasawa ............... 267/140.14 |
| 6,254,069 B1 | | 7/2001 | Muramatsu et al. ... 267/140.14 |
| 6,276,673 B1 | * | 8/2001 | Hibi et al. .............. 267/140.14 |
| 6,305,675 B1 | * | 10/2001 | Muramatsu ............. 267/140.14 |
| 6,325,364 B1 | * | 12/2001 | Muramatsu ............. 267/140.14 |
| 6,422,546 B1 | * | 7/2002 | Nemoto et al. ........ 267/140.14 |

FOREIGN PATENT DOCUMENTS

| | | | | |
|---|---|---|---|---|
| DE | 3316025 | * | 11/1984 | ............. 267/140.14 |
| EP | 0945643 A2 | | 9/1999 | |
| GB | 2346426 A | | 8/2000 | |
| JP | 59103043 | * | 6/1984 | ............. 267/140.14 |
| JP | 4203542 | * | 7/1992 | ............. 267/140.14 |
| JP | 5180263 | * | 7/1993 | ............. 267/140.14 |
| JP | 5231469 | * | 9/1993 | ............. 267/140.14 |
| JP | 6200974 | * | 7/1994 | ............. 267/140.14 |
| JP | 8-289524 | | 11/1996 | |
| JP | 11-351322 | | 12/1999 | |
| JP | 2000-35083 | | 2/2000 | |

* cited by examiner

Primary Examiner—Christopher P. Schwartz
Assistant Examiner—Devon Kramer
(74) Attorney, Agent, or Firm—Rossi & Associates

(57) ABSTRACT

A damping actuator includes: an inner shaft member; an outer sleeve member disposed in a coaxial relationship with each other with a radial spacing therebetween such that the outer sleeve member being movable relative to the inner shaft member; a coil and an inner yoke disposed coaxially with and fixedly mounted to the inner shaft member so as to give inner magnetic pole portions; and a permanent magnet and an outer yoke fixedly mounted to the outer sleeve member so as to give outer magnetic pole portions. The outer magnetic pole portions are opposed to the inner magnetic poles in a radial direction perpendicular to an axial direction of the inner shaft member with a radial gap therebetween, and are offset from the plurality of inner magnetic poles in the axial direction. The coil is energized for generating magnetic axial driving force acting between said inner and outer magnetic poles so that the inner and outer magnetic poles are moved relative to each other in the axial direction. Damping devices equipped with the damping actuator are also disclosed.

15 Claims, 12 Drawing Sheets

DAMPING ACTUATOR AND ACTIVE VIBRATION DAMPING DEVICE EQUIPPED WITH THE ACTUATOR

INCORPORATED BY REFERENCE

The disclosure of Japanese Patent Application No. 2000-297404 filed on Sep. 28, 2000 including the specification, drawings and abstract is incorporated herein by reference in its entirety.

BACKGROUND OF THE INVENTION

1. Field of the Invention

The invention relates generally to a damping actuator applicable to an active vibration-damping device attached to a subject member for exhibiting an active damping effect with respect to vibrations excited in the subject member, and such an active vibration-damping device equipped with the damping actuator. In particular, the invention is concerned with a damping actuator suitably usable in a vibration-damping device for an automotive vehicle, such as an engine mount, a body mount and a vibration damper, and an active vibration-damping device equipped with such a damping actuator.

2. Description of the Related Art

For damping or reducing a vibration of a subject member or a member of a vibration transmitting system, there have been generally used vibration damping means which utilize a damping effect exhibited by a shock absorber or an elastic body member, or vibration isolating or insulating means which utilize a spring effect exhibited by a coil spring or an elastic body member. These vibration-damping devices are all adapted to provide a passive vibration damping or isolating effect, and are not capable of sufficiently damping or isolating a vibration whose characteristics tend to vary. In the light of this drawback of the known vibration device, there have been developed active vibration damping devices adapted to apply an oscillating force to the subject member for actively or positively offsetting or attenuating vibrations to be damped. Known examples of such active vibration damping devices are disclosed in JP-A-11-351322 and JP-A-2000-35083.

The active vibration-damping device requires a damping actuator for generating the oscillating force. Such a damping actuator is required to be capable of accurately controlling a frequency of the oscillating force. To meet this requirement, a known damping actuator, which has been suitably used in the active vibration damping devices as disclosed in the above-indicated publications, includes: an inner shaft member and an outer sleeve member disposed radially outwardly of said inner shaft member with a radial spacing therebetween; a permanent magnet fixed to the inner shaft member; and a coil fixed to the outer sleeve member. Upon energization of the coil, magnetic poles or fields are given on the side of the outer sleeve member and act on magnetic poles or fields given on the side of the inner shaft member owing to the permanent magnet, to thereby generate an oscillating force which causes a relative movement of the inner shaft member and the outer sleeve member in an axial direction of the inner shaft member. In the known damping actuator, therefore, an electric current applied to the coil is regulated so as to control generated electromagnetic force or magnetic force functioning as the oscillating force.

In particular, when the active vibration-damping device is used for damping vibrations excited in an automotive vehicle, the damping actuator is further required to generate a sufficiently large oscillating force with a reduced power consumption, as well as to be compact and lightweight.

However, the known damping actuator is insufficient to meet the above-mentioned requirements. Thus, the known damping actuator has been desired to be improved in all of the above-mentioned requirements, namely to be more (i) compact in size, (ii) light in weight, and (iii) efficient in generating the oscillating force in terms of power consumption.

SUMMARY OF THE INVENTION

It is therefore a first object of this invention to provide a novel damping actuator which is simple in construction and reduced in size and weight, and which is capable of generating an oscillating force with improved efficiency in terms of a required amount of electric power consumption.

It is a second object of this invention to provide an active vibration-damping device which is equipped with the damping actuator according to the present invention.

The first object may be attained according to the following modes (1)–(7) of the invention, and the second object may be attained according to the following modes (8)–(11) of the invention, each of which is numbered like the appended claims and depends from the other mode or modes, where appropriate, to indicate possible combinations of elements or technical features of the invention. It is to be understood that the present invention is not limited to the following modes or combinations of technical features, but may otherwise be recognized based on the thought of the present invention that described in the whole specification and drawings or that may be recognized by those skilled in the art in the light of the disclosure in the whole specification and drawings.

(1) A damping actuator comprising: (a) an inner shaft member; (b) an outer sleeve member disposed coaxially with and radially outwardly of the inner shaft member with a radial spacing therebetween such that the outer sleeve member being movable relative to the inner shaft member; (c) a coil disposed coaxially with and fixedly mounted on the inner shaft member; (d) an inner yoke fixedly disposed on the coil so as to form at an outer circumferential portion thereof a plurality of inner magnetic pole portions located in axially opposite sides of the coil, the plurality of inner magnetic pole portions being given magnetic poles upon energization of the coil; (e) a permanent magnet disposed radially outwardly of said coil and/or said inner yoke with a radial spacing therebetween and fixedly mounted in the outer sleeve member in a coaxial relation with each other so as to extend in a circumferential direction of the outer sleeve member; and (f) an outer yoke fixedly disposed on the permanent magnet and associated with the permanent magnet to form a plurality of outer magnetic pole portions, the plurality of outer magnetic pole portions being given magnetic poles by the permanent magnet, the inner magnetic pole portions and the outer magnetic pole portions are opposed to each other in a radial direction perpendicular to an axial direction of the inner shaft member with a predetermined radial gap therebetween, and are offset from each other in the axial direction, while the coil is in a non-energized state, the coil being energized for generating a magnetic axial driving force acting between the inner and outer magnetic pole portions so that the inner and outer magnetic pole portions are moved relative to each other in the axial direction.

In the damping actuator constructed according to the first mode (1) of this invention described above, the coil is fixed to the inner shaft member, unlike the conventional damping actuator in which the coil is fixed to the outer sleeve member. In this arrangement, a diameter of the coil is made small, whereby a length of a wire winding around the coil is made small to the number of winding of the coil. Since a resistance value of the wire to flow of an electric current therethrough is made small in proportion as the length of the wire is reduced, an amount of electric power consumption of the damping actuator can be reduced. Likewise, the weight of the damping actuator is made small in proportion as the length of the wire is reduced. In addition, the number of winding of the coil to the length of the wire is increased, so that a magnetic flux density of a magnetic field, i.e., a magnetic force generated by the coil is increased in proportion as the number of winding of the coil is increased. Thus, the present damping actuator is capable of generating a large magnetic axial driving force and a resultant sufficiently increased oscillating force.

Further, the damping actuator constructed according to the present mode (1) of the invention, the permanent magnet is fixed to the outer sleeve member, while the permanent magnet is conventionally fixed to the inner shaft member. In this arrangement, the diameters of the permanent magnet and the outer yoke are made large, thus ensuring large circumferential lengths of the permanent magnet and the outer yoke. The large circumferential lengths of the permanent magnet and the outer yoke make it possible to obtain sufficiently large cross sectional area of the permanent magnet and the outer yoke in a cross section perpendicular to the axial direction of the inner shaft member, that is, a sufficiently large overall cross sectional area of a magnetic path, without increasing the wall thickness of the permanent magnet and the outer yoke. This means that the present damping actuator is able to generate a sufficiently large magnetic axial driving force with a sufficiently large cross sectional area of the magnetic path, while ensuring a reduced size thereof with reduced radial wall-thickness of the permanent magnet and the outer yoke.

In the present mode (1) of the invention, the inner shaft member and the outer sleeve member are preferably made of rigid materials so that the inner shaft member and the outer sleeve member constitutes an oscillating force transmitting path. For instance, the inner shaft member and the outer sleeve member made of metallic materials such as steel, an aluminum alloy or the like, are suitably used. The inner and outer yoke members are preferably made of a ferro magnetic material having a high permeability, e.g., soft iron. For instance, a material exhibiting a low magnetic hysteresis is suitably selected for the inner and outer yoke member. The permanent magnet may consist of either a single cylindrical member continuously extending over its circumference or a plurality of arcuate or curved plate-like members arranged in the circumferential direction. The permanent magnet may be suitably selected, in the light of a position or a shape of the permanent magnet, from various kinds of permanent magnets, e.g., a permanent magnet magnetized to have opposite magnetic poles at its axially opposite end faces and a permanent magnet magnetized to have opposite magnetic poles at its opposite surfaces in a radial direction perpendicular to the axial direction, i.e., at a radially inner and outer circumferential surfaces. At least one coil and at least one permanent magnet essentially need, so as to give effective magnetic poles to the inner magnetic pole portions and the outer magnetic pole portions, respectively. The numbers of the coil and the permanent magnet may be desirably increased without a specific limitation.

The inner magnetic pole portions and the outer magnetic pole portions are suitably arranged in the axial direction so that an overall magnetic force, i.e., a magnetic attractive force and a magnetic repellent force acting between the inner magnetic pole portions and the outer magnetic pole portions provides as an axial driving force between the inner shaft member and the outer shaft member, thereby causing an relative axial movement thereof. To generate the axial driving force, at least one of the inner magnetic pole portions and the corresponding outer magnetic pole portion, which are opposed to each other in the radial direction, are arranged such that an axially center portion of the inner magnetic pole portion is offset from an axially center portion of the outer magnetic pole portion in the axial direction. Preferably, all of the inner and outer magnetic pole portions, which are opposed to each other in the radial direction, have the axially center portions which are offset from each other in the axial direction.

(2) A damping actuator according to the above-indicated mode (1), wherein said permanent magnet has a magnetic pole N at one of an inner and an outer circumferential surface thereof and a magnetic pole S at an other one of the inner and outer circumferential surfaces thereof.

In the damping actuator constructed according to the above-indicated mode (2) of the invention, the permanent magnet has a sufficiently large area in cross section perpendicular to a direction in which the magnetic poles N and S are opposed to each other, while having a wall-thickness which is minimized in the direction in which the magnetic poles N and S are opposed to each other, thus reducing an overall volume or size of the permanent magnet. Further, the thus arranged permanent magnet may be used to form one outer magnetic pole portion by utilizing one of the opposite magnetic poles N and S thereof.

(3) A damping actuator according to the above-indicated mode (1) or (2), wherein at least one of the outer magnetic pole portions is located in axially intermediate position between the inner magnetic pole portions located in axially opposite sides of the coil and is given one of opposite magnetic poles N and S, and the other of the outer magnetic pole portions are opposed in the radial direction to and offset in the axial direction from the inner magnetic pole portions, respectively, and are given the other of opposite magnetic poles N and S, while the coil is in the non-energized state.

In the above-indicated mode (3), since the two inner magnetic pole portions and the three outer magnetic pole portions which are positioned relative to each other in the axial direction in the non-energized state of the coil, as described above, magnetic forces acting between these inner and outer magnetic pole portions provide respective axial driving forces in the same axial direction, when the coil is energized in one direction. Therefore, the damping actuator according to this mode (3) is capable of generating with high efficiency a sufficiently large axial driving or oscillating force between the inner shaft member and the outer sleeve member.

(4) A damping actuator according to any one of the above-indicated modes (1)–(3), wherein the coil comprises a plurality of coils which are spaced apart from each other in said axial direction of said inner shaft member with a predetermined axial spacing therebetween.

In the damping actuator constructed according to the above mode (4), a plurality of sets of the inner yoke disposed on the axially opposite sides of the coil and the outer yoke disposed so as to correspond to the inner yoke are arranged in the axial direction. That is, the present damping actuator can generate a significantly large oscillating force corresponding to a sum of magnetic forces generated by the respective sets of inner and outer yokes, thus ensuring an increased oscillating force without enlarging an outer diameter of the outer sleeve member. All or some of the plurality of coils may possibly be operable by using a common power supply controller and a common feeder circuit. Further, all or some of the plurality of coils may share the outer yoke in a single form. In this case, all or some of the plurality of coils may share the permanent magnet in a single form.

(5) A damping actuator according to the above-indicated mode (4), wherein the outer yoke is disposed radially outwardly of the plurality of coils so as to extend in the axial direction over at least two of the plurality of coils, the outer yoke having two outer magnetic pole portions which are given respective magnetic poles N and S and opposed in the radial direction to the at least two of the plurality of coils, respectively, each of the two outer magnetic pole portions being located in an axially intermediate portion between the inner magnetic pole portions located in the axially opposite side of a corresponding one of the at least two of the plurality of coils, while the coil is the non-energized state.

In the above-indicated mode (5), the damping actuator is capable of effectively generating the oscillating force acting between the inner shaft member and the outer sleeve member in the axial direction, while reducing the number of the outer magnetic pole portions. Further, the plurality of coils share the single outer yoke, leading to a simple structure of the outer yoke and a share use of the single permanent magnet with the plurality of coils.

(6) A damping actuator according to any one of the above-indicated modes (1)–(5), wherein the inner shaft member is formed with a bore extending in the axial direction thereof for accommodating a lead wire through which an electric current is applied to the coil.

In the damping actuator according to the above-indicated mode (6), the bore of the inner shaft member is effectively utilized for accommodating the lead wire, and the lead wire is effectively spaced apart from the other components which are disposed on the sides of inner shaft member and the outer sleeve member and moved relative to each other in the axial direction. Therefore, the presence of the lead wire never interrupts the axial movement of the components, leading to a high-stabilized operation of the damping actuator.

(7) A damping actuator according to any one of the above-indicated modes (1)–(6), further comprising a guide mechanism interposed between the inner shaft member and the outer sleeve member so as to permit a relative axial movement of the inner shaft member and the outer sleeve member while preventing a relative radial movement thereof. The provision of this guide mechanism stabilizes the axial relative movement of the inner shaft member and the outer sleeve member, whereby the damping actuator can generate the oscillating force with stabilized output characteristics. The guide mechanism may be a rubber elastic body or a leaf spring made of metal or a synthetic resin material, which serves to elastically connect the inner shaft member and the outer sleeve member while allowing the axial relative movement of the inner shaft member and the outer sleeve member. Alternatively, the guide mechanism may comprise: a guide pin fixed to one of the inner shaft member and the outer sleeve member so as to protrude therefrom; and a guide sleeve or bushing fixed to the other of the inner shaft member and the outer sleeve member and adapted to slidably movably receive the guide pin so that the guide pin is reciprocally movable in a desirable axial direction.

(8) An active damping oscillator, which is interposed between a vibration-source-side member and a subject member whose vibration to be damped that are connected to each other to form a vibration system, and which is adapted to apply an oscillating force to the subject member, the oscillator comprising: a damping actuator defined in any one of the above modes (1)–(7), the inner shaft member being fixed to one of the vibration-source-side member and the subject member, and the outer sleeve member being fixed to an other one of the vibration-source-side member and the subject member.

(9) An active vibration damping device interposed between a vibration-source-side member and a subject member whose vibration to be damped that are connected to each other to form a vibration system, the vibration damping device comprising: a first mounting member fixed to one of the vibration-source side member and the subject member; a second mounting member fixed to an other one of the vibration-source side member and the subject member; an elastic body elastically connecting the first and second mounting members; a damping actuator defined in any one of the above-indicated modes (1)–(7) adapted to generate an oscillating force between the inner shaft member and the outer sleeve member thereof and apply the oscillating force between the first and second mounting members.

(10) An active vibration damping device according to the above-indicated mode (9), further comprising: a primly fluid chamber partially defined by the elastic body and filled with a non-compressible fluid; an oscillating member partially defining the primary fluid chamber and being oscillated by the damping actuator so as to generate a pressure change of the non-compressible fluid in the primary fluid chamber, the pressure change of the non-compressible fluid in the primary fluid chamber acting as an oscillating force between the first and second mounting members. (11) An active vibration damper fixed to a subject member for damping vibrations of the subject member, the damper comprising: an damper actuator defined in any one of the above-indicated modes (1)–(7); an elastic member elastically connecting the inner shaft member and the outer sleeve member of the damper actuator; and a mass member fixed to one of the inner shaft member and the outer sleeve member, an other one of the inner shaft member and the outer sleeve member being fixed to the subject member.

In the active vibration damper constructed according to the above-indicated mode (11), the mass member is elastically supported by the subject member via the elastic member. That is, the mass member and the elastic member cooperate to form a vibration system. Upon energization of the coil, the oscillating force generated by the damping actuator is applied to the mass member and then transmitted via the vibration system to the subject member with excellent efficiency. Thus, the present active vibration damper is capable of exhibiting a high active damping effect with respect to the subject member.

As is understood from the foregoing description, the damping actuator constructed according to the present invention, as well as the active vibration damping device and the active vibration damper which are equipped with the damping actuator of the present invention, are all capable of generating a sufficiently large oscillating force while ensuring high power consumption efficiency and sufficient reduction in the size and weight thereof.

BRIEF DESCRIPTION OF THE DRAWINGS

The above and other objects, features, advantages and technical and industrial significance of this invention will be better understood by reading the following detailed description of presently preferred embodiments of the invention, when considered in connection with the accompanying drawings, in which.

DETAILED DESCRIPTION OF THE PREFERRED EMBODIMENTS

Figure 1:
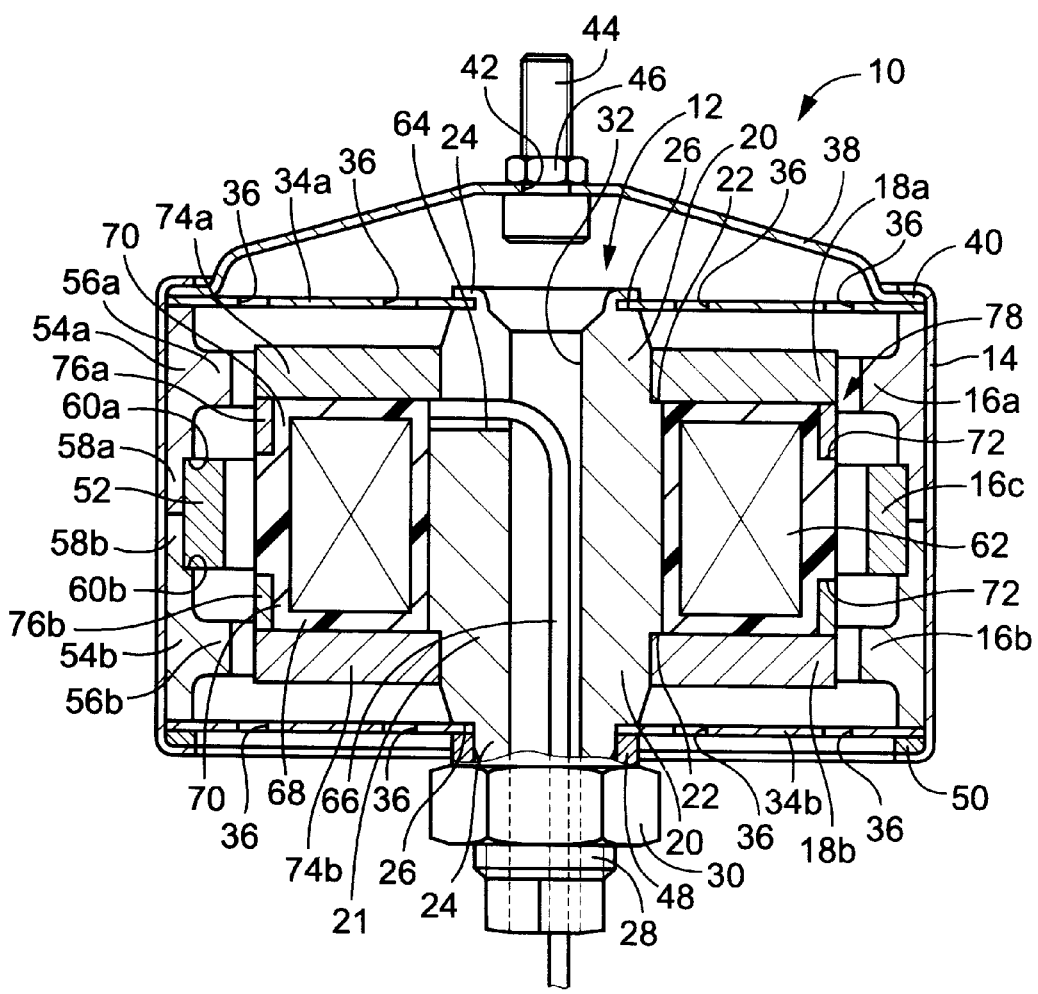
FIG. 1 is an elevational view in longitudinal cross section of a damping actuator constructed according to one preferred embodiment of this invention.

Referring first to FIG. 1, a damping actuator constructed according to a first embodiment of this invention is shown generally at 10. This damping actuator 10 includes an inner shaft member in the form of an inner sleeve 12 and an outer sleeve member in the form of an outer sleeve 14 which are disposed coaxially with each other with a suitable radial spacing therebetween. As described below in detail, the inner and outer sleeves 12, 14 are axially movable relative to each other by a force applied therebetween in the axial direction, which force is generated based on a magnetic force acting between inner magnetic pole portions 18 provided on the inner sleeve 12 and outer magnetic pole portions 18 provided on the outer sleeve 14.

More specifically described, the inner sleeve 12 is a small-diameter thick-walled cylindrical member having a bore 32 extending in its axial direction with a generally constant cross sectional area. The inner sleeve 12 has a pair of first cylindrical fixing portions 20, 20 at its axially opposite end portions. The outer diameter of each of the first fixing cylindrical portion 20 is made smaller than that of an axially intermediate portion 21 of the inner sleeve 12, so that the first cylindrical fixing portions 20, 20 and the axially intermediate portion 21 cooperate to form a pair of first shoulder surfaces 22, 22 on the outer circumferential surface of the inner sleeve 12. Each of the first cylindrical fixing portions 20, 20 has a small diameter portion at its protruding end portion to thereby provide a second cylindrical fixing portion 24. The each first cylindrical fixing portions 20 and the corresponding second cylindrical fixing portion 24 cooperate with each other to form a second shoulder surface 26 on the outer circumferential surface of the inner sleeve 12. One of the two second cylindrical fixing portions 24, 24 which is formed on the axially lower end portion of the inner sleeve 12 as seen in FIG. 1 (hereinafter referred to as the "lower second fixing portion 24), is formed with a bolt portion 28 at its axially intermediate portion, and a nut 30 is screwed on the bolt portion 28. That is, the inner sleeve 12 can be bolted to a subject member whose vibration to be damped (not shown) by utilizing the bolt portion 28 and the nut 30 screwed on the bolt portion 28, for example. The lower second fixing portion 24 has a squared outer circumferential surface formed by chamfering at its axially lower end portion. The other one of the two second cylindrical fixing portion 24, 24 which is formed on the axially upper end portion of the inner sleeve 12 as seen in FIG. 1 (hereinafter referred to as the "upper second fixing portion 24), has an inside diameter which is larger than the inside diameter of the bore 32, so that the wall-thickness of the upper second fixing portion 24 is made small enough to be bent. In addition, the inside diameter of the upper second fixing portion 24 is made larger than an outer diameter of a head of a bolt 44 (which will be described later).

The outer sleeve 14 is disposed radially outwardly of the inner sleeve 12 with a predetermined radial spacing therebetween. The outer sleeve 14 is a large-diameter hollow cylindrical member. A pair of leaf springs 34a, 34b are disposed at axially upper and lower end portions of the inner and outer sleeve 14, so as to elastically connect the inner and outer sleeves 12, 14 with each other. Each of the leaf springs 34a, 34b has a thin-walled disk-like shape, and has a spiral hole 36 formed therethrough and extending spirally from its central portion to its peripheral portion. The spiral hole 36 facilitates elastic deformation of the leaf spring 34 in the axial direction. For firmly fixing the leaf spring 34a to the axially upper end portion of the inner sleeve 12, the leaf spring 34a is inserted onto the upper second fixing portion 24, and then the upper second fixing portion 24 is bent in a radially outward direction and pressed onto the inner peripheral portion of the leaf spring 34a. In this condition, the leaf spring 34a is fixedly gripped at its inner peripheral portion by and between the second shoulder 26 and the upper second fixing portion 24.

A cover member 38 is disposed axially upwardly of the leaf spring 34a. The cover member 38 is a generally inverted cup shaped metallic member, and has an outward flange portion 40 at its open-end portion. The outward flange portion 40 of the cover member 38 is superposed on the outer peripheral portion of the leaf spring 34a. The cover member 38 further has a central hole 42 formed through its upper bottom wall. The above-mentioned bolt 44 extends through the central hole 42 of the cover member 38, and is screwed into a nut 46 so as to be fixed to the cover member

38. That is, the cover member 38 can be bolted to a vibration source-side member by utilizing the bolt 44 and the nut 46, for example.

The leaf spring 34*b* is inserted onto the lower second fixing portion 24. A spacer 48 in the form of a small-diameter cylinder is superposed on the axially lower surface of the leaf spring 34*b*, as seen in FIG. 1. That is, the leaf spring 34*b* is firmly fixed to the inner sleeve 12 such that the inner peripheral portion of the leaf spring 34*b* is firmly gripped by and between the second shoulder 26 and the spacer 48 in the axial direction.

The outer sleeve 14 fixedly support a cylindrical permanent magnet 52 disposed at its axially central portion and a pair of cylindrical outer yoke members 54*a*, 54*b* disposed on the axially opposite sides of the permanent magnet 52, respectively.

The outer yoke members 54*a*, 54*b* have at their axially central portions respective annular protrusions 56*a*, 56*b*, each protruding radially inwardly and extending continuously in its circumferential direction with an approximately constant cross sectional area. An inside diameter of the outer yoke member 54*a* is increased at its axially lower end portion so as to form an annular fixing recess 58*a*, as seen in FIG. 1. In the presence of the annular fixing recess 58*a*, the outer yoke member 54*a* has a stepped surface 60*a* on its inner circumferential surface. Further, an inside diameter of the outer yoke member 54*b* is increased at its axially upper end portion so as to form an annular fixing recess 58*b* as seen in FIG. 1. In the presence of the annular fixing recess 58*b*, the outer yoke member 54*b* has a stepped surface 60*b* on its inner circumferential surface. The thus formed outer yoke members 54*a*, 54*b* are superposed on each other in the axial direction so that the axially opposite end faces of the permanent magnet 52 is compressed by and between the stepped surfaces 60*a*, 60*b* in the axial direction. In this condition, an outer circumferential surface of the permanent magnet is held in abutting contact with the inner surfaces of the annular fixing recesses 58*a*, 58*b*, while an inner circumferential surface of the permanent magnet is substantially aligned in the axial direction with the inner circumferential surfaces of the annular protrusions 56*a*, 56*b* as seen in axial cross section. These annular protrusions 56*a*, 56*b* and the permanent magnet 52 serve at their radially inner portions as three outer magnetic pole portions 16*a*, 16*b*, 16*c*, which are spaced apart from each other in the axial direction.

Figure 2:
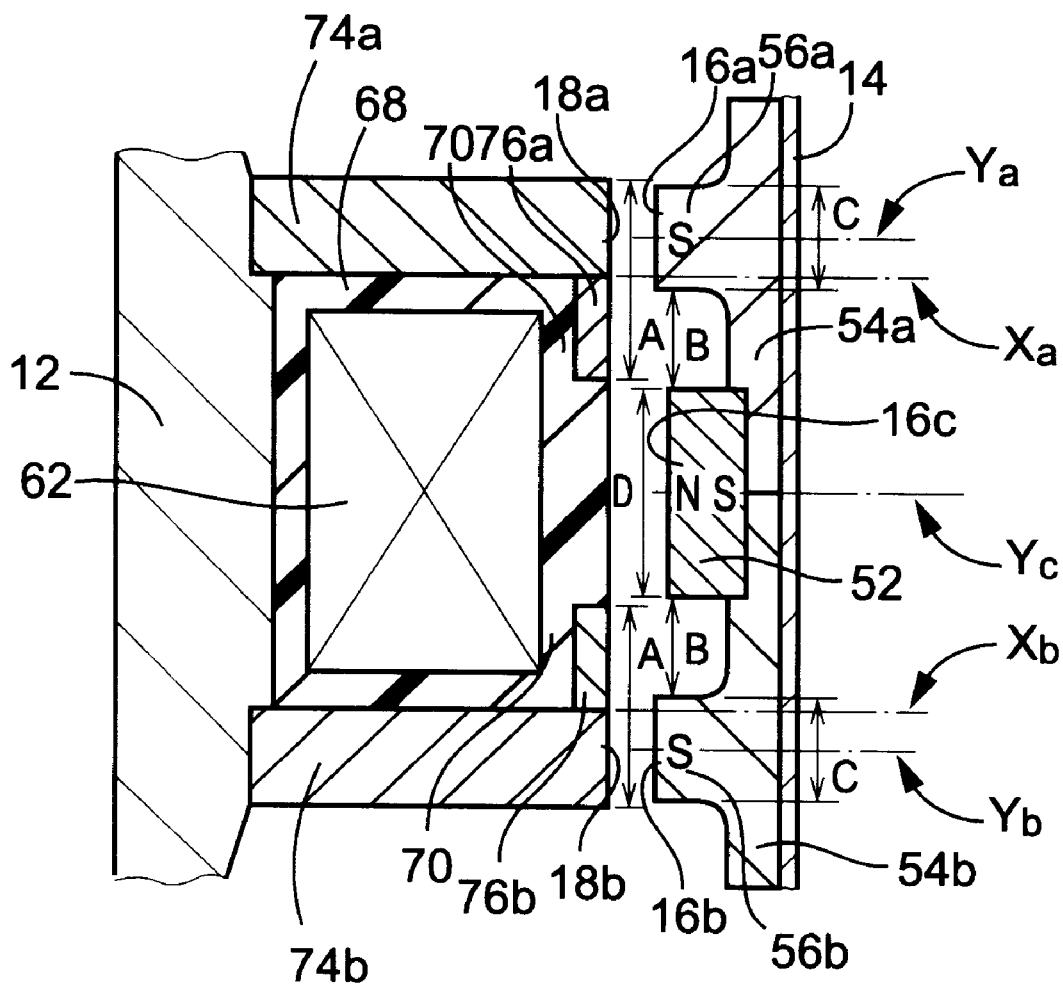
FIG. 2 is a longitudinal cross sectional view schematically illustrating a basic structure of the damping actuator of FIG. 1.

As shown in FIG. 2, the permanent magnet 52 is magnetized in the radial direction thereof such that a magnetic pole N is given in its inner circumferential surface, while a magnetic pole S is given in its outer circumferential surface. In this arrangement, the outer yoke members 54*a*, 54*b* are held in contact with the magnetic pole S of the permanent magnet 52. Therefore, the magnetic pole S is given to the outer magnetic pole portions 16*a*, 16*b* formed by the annular protrusions 56*a*, 56*b* of the outer yoke members 54*a*, 54*b*, while the magnetic pole N is given to the outer magnetic portion 16*c* formed by the inner circumferential portion of the permanent magnet 52.

The axially opposite end portions of the outer sleeve 14 are bent in its radially inward direction, whereby the cover member 38 and the leaf spring 34*a* are fixedly gripped at their outer peripheral portions by and between the axially upper end face of the outer yoke member 54*a* and the bent axially upper end portions of the outer sleeve 14, and the outer peripheral portion of the leaf spring 34*b* and a spacer 50 superposed on the outer peripheral portion of the leaf spring 34*b* are fixedly gripped by and between the axially lower end portion of the outer yoke member 54*b* and the bent axially lower end portion of the outer sleeve 14. In this condition, the inner and outer sleeves 12, 14 are elastically connected with each other at their axially opposite end portions via the pair of leaf springs 34*a*, 34*b*, thus restricting a radial relative movement between the inner and outer sleeves 12, 14, while permitting an axial relative elastic movement between the inner and outer sleeves 12, 14. It is noted that a guide mechanism is constituted by the pair of leaf springs 34*a*, 34*b*, in the present embodiment.

An annular shaped coil 62 wound in its circumferential direction is disposed radially outwardly on the axially intermediate portion of the inner sleeve 12. While the inner sleeve 12 is formed with a slit 64 extending axially outwardly from the axially intermediate portion thereof so as to open in its axially upper end face, a lead wire 66 of the coil 62 is accommodated within the bore 32 of the inner sleeve 12 through the slit 64, so as to extend through the bore 32.

The coil 62 is covered by an electrically insulative bobbin 68. Described in detail, the bobbin 68 is a hollow annular member. The bobbin 68 has fixing portions 70, 70 at its axially opposite end portions in which the outer diameter of the bobbin 68 is made smaller than the axially intermediate portion. In the presence of the fixing portions 70, 70, two shoulder surfaces 72, 72 are formed on the outer circumferential surface of the bobbin 68. The thus constructed bobbin 68 is fixedly mounted on the inner sleeve 12, so that the coil 62 is fixedly disposed radially outwardly of the outer circumferential surface of the inner sleeve 12.

To the bobbin 68, a pair of first inner yoke members 76*a*, 76*b* and a pair of second inner yoke members 74*a*, 74*a* are fixed. More specifically, the first inner yoke members 76*a*, 76*b* are thin-walled annular members and fixedly mounted on the fixing portions 70, 70 of the bobbin 68, respectively. The second inner yoke members 74*a*, 74*b* are thick-walled annular members and fixedly mounted on the respective first cylindrical fixing portions 20, 20 of the inner sleeve 12 while being held in abutting contact with the first shoulder surfaces 22, 22 to thereby be positioned in the axial direction of the inner sleeve 12. With the second inner yoke members 74*a*, 74*b* positioned in the axial direction as described above, the second inner yoke members 74*a*, 74*b* are held in abutting contact with the axially upper and lower end faces of the bobbin 68, respectively, and held in abutting contact with corresponding axial end faces of the first yoke members 76*a*, 76*b*. In the present embodiment, the second inner yoke members 74*a*, 74*b* as well as the first inner yoke members 76*a*, 76*b* have an axial length which is approximately equal to that of the annular protrusions 56*a*, 56*b* of the outer yoke members 54*a*, 54*b*. Further, the first and second inner yoke members 76*a*, 76*b*, 74*a*, 74*b*, and the bobbin 68 have the substantially same outer diameter. In the present embodiment, the second inner yoke members 74*a*, 74*b* and the first inner yoke members 76*a*, 76*b* cooperate to form an inner yoke 78 disposed on the axially opposite sides of the coil 62. This inner yoke 78 is adapted to provide at its outer circumferential portion respective inner magnetic pole portions 18*a*, 18*b* which are located in the axially opposite side of the coil 62 and which are spaced apart from each other in the axial direction.

In the damping actuator 10 constructed as described above, upon application of an electric current to the coil 62 through the lead wire 66, magnetic fields are produced and the coil 62 functions as electromagnets, so the inner magnetic pole portions 18*a*, 18*b* are given magnetic poles depending upon the directions of flows of the electric current through the coil 62.

When the coil 62 is placed in a non-energized state, the inner and outer sleeves 12, 14 is held in a predetermined axial neutral position as shown in FIG. 2, by a holding force including equilibrium of a magnetic force acting between the inner magnetic pole portions 18a, 18b and the outer magnetic pole portions 16a, 16b, 16c by the permanent magnet 52 and a spring force generated by the leaf springs 34a, 34b. It should be appreciated the leaf springs 34a, 34b function as an elastic support member too, in the present embodiment. In this condition, the inner magnetic pole portions 18a, 18b located on the side of the inner sleeve 12 are opposed in the radial direction to the outer magnetic pole portions 16a, 16b, 16c located on the side of the outer sleeve 14, with a predetermined small radial gap therebetween in the radial direction of the inner and outer sleeves 12, 14. Further, the inner magnetic pole portions 18a, 18b are offset from the outer magnetic pole portions 16a, 16b, 16c in the axial direction. There will be described in detail with reference to FIG. 2. When the inner sleeve 12 is placed in its predetermined neutral axial position relative to the outer sleeve 14, as shown in FIG. 2, a centerline Xa perpendicular to the axis of the inner sleeve 12 and passing an axially center point of the inner magnetic pole portion 18a is located axially downwardly of a centerline Ya perpendicular to the axis of the inner sleeve 12 and passing an axially center point of the outer magnetic pole portion 16a. On the other hand, a centerline Xb perpendicular to the axis of the inner sleeve 12 and passing an axially center point of the inner magnetic pole portion 18b is located axially upwardly of a centerline Yb perpendicular to the axis of the inner sleeve 12 and passing an axially center point of the outer magnetic pole portion 16b. In addition, a centerline Yc perpendicular to the axis of the inner sleeve 12 and passing an axially central portion of the outer magnetic pole portion 16c is offset from both of the inner magnetic pole portions 18a, 18b in the axial direction and passing an axially central portion between the inner magnetic pole portions 18a, 18b.

The inner magnetic pole portions 18a, 18b have an axial length "A" that is made larger than an axial distance "B" between the outer magnetic pole portions 16a and 16c and the outer magnetic pole portions 16c and 16. That is, the inner magnetic pole portions 18a, 18b are directly opposed to the outer magnetic pole portions 16a, 16b, 16c in the radial direction without being inclined in the axial direction of the inner sleeve 12. Moreover, the axial length "A" of the inner magnetic pole portions 18a, 18b is dimensioned to be larger than an axial length "C" of the outer magnetic pole portions 16a, 16b and to be substantially similar to an axial length "D" of the outer magnetic pole portion 16c.

In order to ensure an effective generation of the magnetic force at each of the inner and outer magnetic pole portions 18a, 18b, 16a, 16b, 16c, the first and second inner yoke members 74a, 74b, 76a, 76b and the outer yoke members 54a, 54b are preferably made of a ferromagnetic material, e.g., iron, while the leaf springs 34a, 34b are preferably made of a non-magnetic material, e.g., stainless steel. The inner and outer sleeves 12, 14 are made of any metallic materials. Preferably, the outer sleeve 14 adapted to support the permanent magnet 52 is made of a non-magnetic metallic material, while the inner sleeve 12 adapted to form the inner yoke 78 for supporting the coil 62 is made of a ferromagnetic material.

There will next be described an operation of the present damping actuator 10 constructed as described above. When the coil 62 is placed in the non-energized state, the inner magnetic pole portions 18a, 18b are not given magnetic poles, and the inner sleeve 12 and the outer sleeve 14 are held in the predetermined neutral axial position of FIG. 2 by the above-indicated holding force, e.g., by equilibrium of the static magnetic force acting between the outer magnetic pole portions 16a, 16b, 16c and the inner magnetic pole portions 18a, 18b based on the opposite magnetic poles N and S given to the outer magnetic pole portions 16a, 16b, 16c. If the equilibrium is lost due to a relative axial movement of the inner sleeve 12 and the outer sleeve 14 from the neutral position while the coil 62 is in the non-energized state, the inner sleeve 12 and the outer sleeve 14 are returned to the neutral position for restoring the equilibrium. That is, a magnetic axial driving force is applied between the inner and outer sleeves 12, 14 for restoring the equilibrium and the neutral position thereof. When an amount of the relative axial movement of the inner and outer sleeves 12, 14 exceeds a predetermined value, the inner and outer sleeves 12, 14 may not be returned to their neutral position by the magnetic axial driving force indicated above. Such an excessive amount of relative axial movement of the inner and outer sleeves 12, 14 is prevented by a stop mechanism in the form of the pair of leaf springs 34a, 34b in the present damping actuator 10, assuring high stability of returning of the inner and outer sleeves 12, 14 to their neutral position by the first magnetic forces based on the magnetic poles N and S of the outer magnetic pole portions 16a, 16b, 16c. In this respect, since the second upper fixing portion 24 of the inner sleeve 12 has the inside diameter which is made larger than the outer diameter of the head of the bolt 44, undesirable contact or interface between the inner sleeve 12 and the bolt 44 is prevented even when the inner and outer sleeves 12, 14 are axially moved relative to each other by an excessively large amount.

Figure 3:
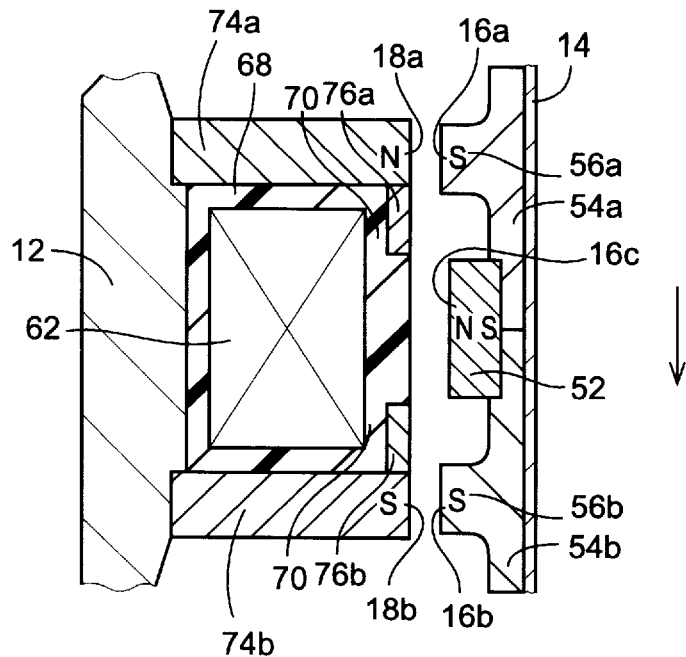
FIG. 3 is a longitudinal cross sectional view for explaining one operating state of the damping actuator of FIG. 1.

When the coil 62 is energized, it functions as an electromagnet. In the present embodiment, the coil 62 is energized in the opposite directions. When the coil 62 is energized in one direction, the inner magnetic pole portion 18a is given a magnetic pole N while the inner magnetic pole portion 18b is given magnetic pole S, as indicated in FIG. 3, by way of example. As a result, the equilibrium of the static magnetic force is lost, so that the inner and outer sleeve 12, 14 are moved relative to each other by the magnetic axial driving force for restoring the equilibrium. More specifically, the outer sleeve 14 is moved relative to the inner sleeve 12 in the axially downward direction as indicated by an arrow in FIG. 3, by the magnetic axial driving force consist of the repellent forces acting between the same magnetic poles and the attractive forces acting between the opposite magnetic poles. That is, the magnetic axial driving force is forcedly generated between the inner magnetic pole portions 18a, 18b and the outer magnetic pole portions 16a, 16b, 16c by energizing the coil 62.

Figure 4:
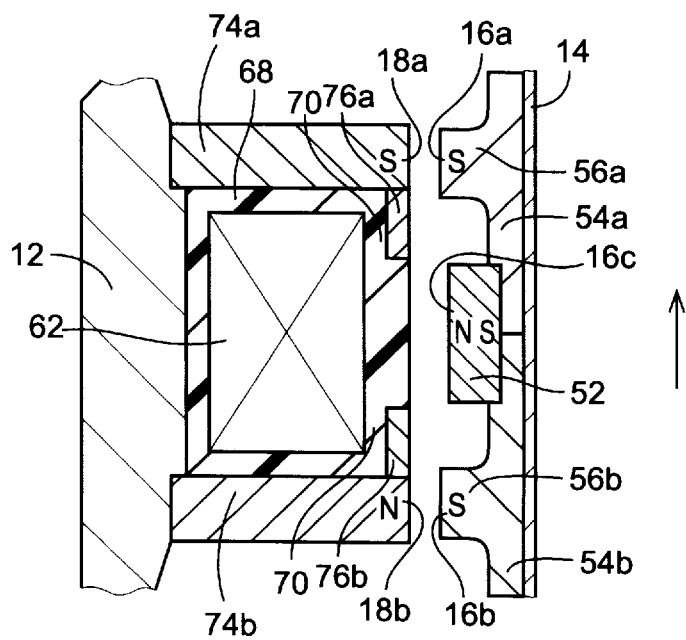
FIG. 4 is a longitudinal cross sectional view for explaining another operating state of the damping actuator of FIG. 1.

When the direction of energization of the coil 62 is reversed, the magnetic poles of the energized coil 62 functioning as an electromagnet are reversed, namely, the inner magnetic pole portion 18a is given a magnetic pole S while the inner magnetic pole portion 18b is given magnetic pole N, as indicated in FIG. 4, by way of example. As a result, the outer sleeve 14 is moved relative to the inner sleeve 12 in an axially upward direction as indicated by an arrow in FIG. 4, by the magnetic axial driving force consist of the repellent forces acting between the same magnetic poles and the attractive forces acting between the opposite magnetic poles.

In the damping actuator 10 constructed according to the present embodiment, the coil 62 may be energized by application of an alternating or pulsating current or alternately energized and de-energized, so as to axially oscillate the outer sleeve 14 relative to the inner sleeve 12.

It should be appreciated that the damping actuator 10 according to the present embodiment employs the coil 62 which is fixed to the inner sleeve 12 rather than the outer sleeve 14, unlike a conventional damping actuator. This arrangement makes it possible to reduce a diameter of the coil 62, permitting a relatively small wire length to the number of winding of the coil 62. As a result, a resistance value of the wire to flow of an electric current therethrough can be made small in proportion as the length of the wire is reduced, thus reducing an amount of electric power consumption of the damping actuator 10. Likewise, the weight of the coil 62 can be made small in proportion as the length of the wire is reduced.

In addition, the number of winding of the coil 62 is increased with respect to the length of the wire, so that a magnetic flux density of a magnetic field, i.e., a magnetic force generated by the coil 62 is increased in proportion as the number of winding of the coil 62 is increased. Thus, the present damping actuator 10 is capable of generating a large magnetic force and a resultant sufficiently increased oscillating force.

In the present damping actuator 10, the permanent magnet 52 is fixed to the outer sleeve 14 rather than the inner sleeve 12, unlike the conventional damping actuator. In this arrangement, the diameters of the permanent magnet 52 and the outer yoke members 54a, 54b are made large, thus ensuring relatively large circumferential lengths of the permanent magnet 52 and the outer yoke members 54a, 54b. The enlarged circumferential lengths of the permanent magnet 52 and the outer yoke member 54a, 54b make it possible to obtain sufficiently large cross sectional area of the permanent magnet 54 and the outer yoke members 54a, 54b in a cross section perpendicular to the axial direction of the inner shaft member, that is, a sufficiently large overall cross sectional area of a magnetic path, without increasing the wall thickness of the permanent magnet 52 and the outer yoke members 54a, 54b. This means that the present damping actuator 10 is able to generate a sufficiently large magnetic force with a sufficiently large cross sectional area of the magnetic path, while ensuring a reduced size thereof with reduced radial wall-thickness of the permanent magnet 52 and the outer yoke members 54a, 54b.

In the present damping actuator 10, the presence of leaf springs 34a, 34b ensures a high stability of the axially oscillating motion of the outer sleeve 14 relative to the inner sleeve 12, whereby the damping actuator 10 can generate axial oscillating forces with stabilized output characteristics, based on the stabilized axial oscillating motion of the outer sleeve 14 relative to the inner sleeve 12.

Figure 5:
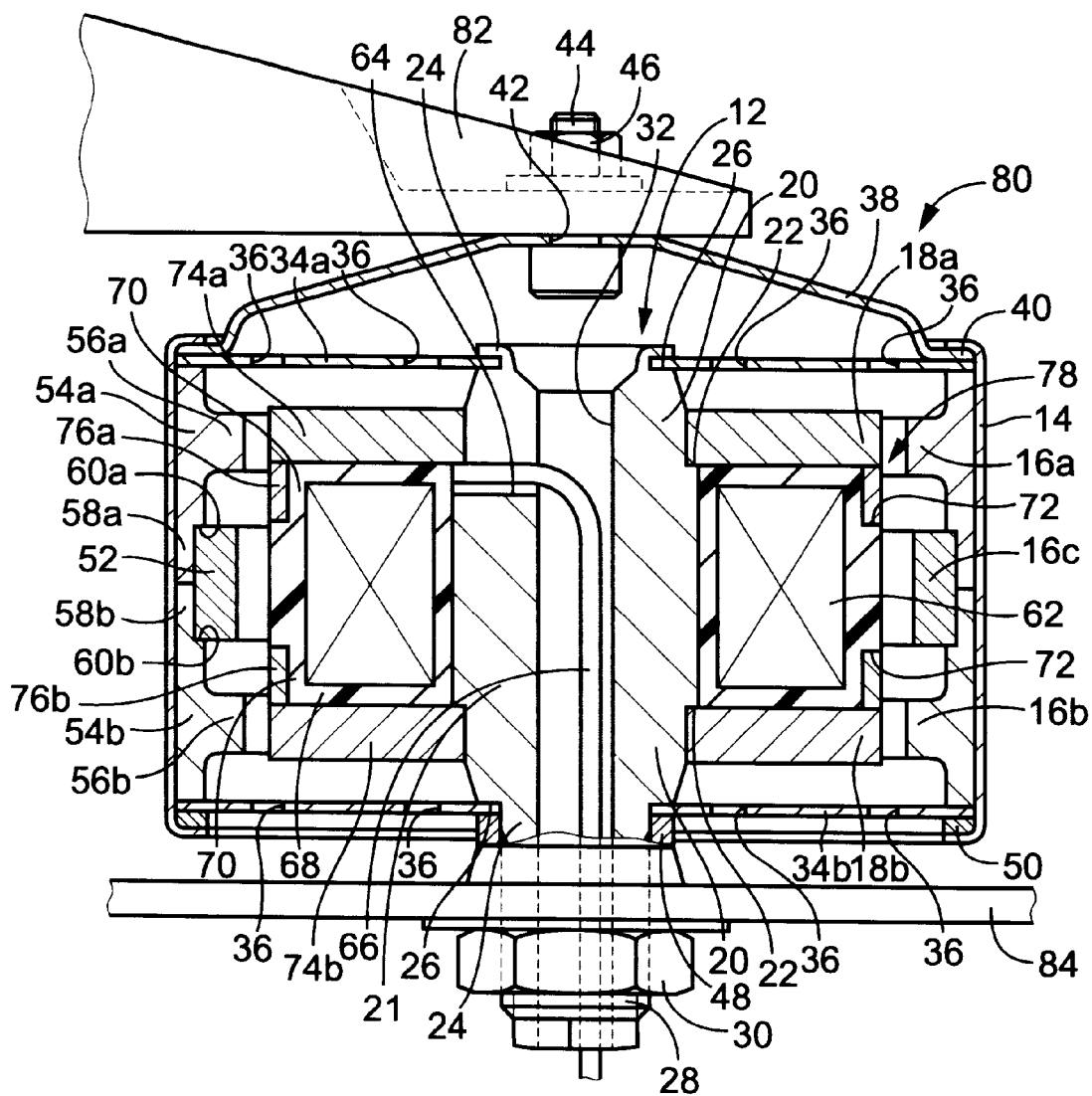
FIG. 5 is an elevational view in longitudinal cross section of an active damping oscillator equipped with the damping actuator of FIG. 1.

Referring next to FIG. 5, there will be described an example of application of the damping actuator 10 to an active damping oscillator 80 for an automotive vehicle. The same reference numerals as used in the damping actuator 10 of FIG. 1 are used to identify the functionally corresponding elements, which will not be described to avoid redundant explanation.

The active damping oscillator 80 is similar in construction to the damping actuator 10. The active damping oscillator 80 is fixed to an engine bracket 82 as a vibration-source-side member at the cover member 38 thereof, i.e., at the outer sleeve 14 by means of the bolt 44 and the nut 46, while being bolted to an body 84 of the vehicle as a subject member whose vibration to be damped at the inner sleeve 12 by means of the bolt portion 28 and the nut 30.

In the active damping oscillator 80, the coil 62 may be energized by application of an alternating or pulsating current, or alternately energized and de-energized, so as to axially oscillate the outer sleeve 14 relative to the inner sleeve 12. As described above by reference to FIG. 5, the inner and outer sleeves 12, 14 are attached to the body 84 of the vehicle and the engine bracket 82, respectively, so that a reaction force of the oscillating force generated between the inner sleeve 12 and the outer sleeve 14 is applied to the engine bracket 82 as an oscillating force. In this respect, the energization of the coil 62 is suitably controlled depending upon the frequency, amplitude and phase of the vibration to be damped, so that the active damping oscillator 80 exhibits a high active damping effect with respect to the vibration to be damped.

Like the damping actuator 10, the active damping oscillator 80 is capable of generating a relatively large oscillating force with a reduced power consumption, with reduced weight and size thereof.

Figure 6:
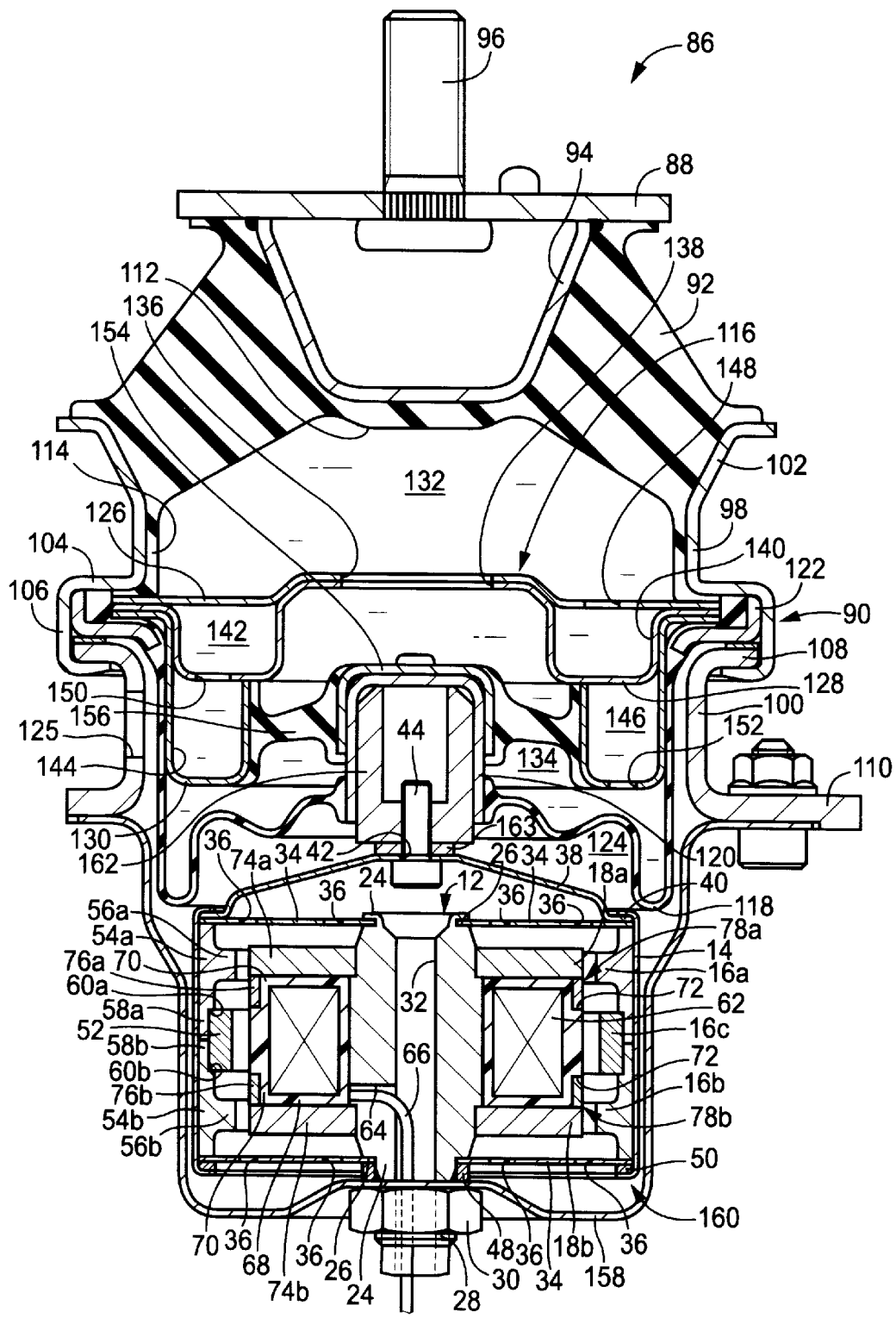
FIG. 6 is an elevational view in longitudinal cross section of an engine mount equipped with the damping actuator of FIG. 1.

Referring next to FIG. 6, there will be described an example of application of the damping actuator 10 to a vibration damping device in the form of a fluid-filled elastic engine mount 86 for an automotive vehicle. The engine mount 86 includes a first mounting member 88 and a second mounting member 90 which are made of metallic materials. These first and second mounting members 88, 90 are spaced apart from each other in an axial direction of the engine mount 86, i.e., a vertical direction as seen in FIG. 6 and elastically connected to each other by an elastic body 92 made of a rubber material and interposed therebetween. The first mounting member 88 is fixed to a vibration-source-side member, while the second mounting member 90 is fixed to a subject member whose vibration to be damped, so that the vibration-source-side member is mounted on the subject member in a vibration damping fashion. The same reference numerals as used in the damping actuator 10 of FIG. 1 are used to identify the functionally corresponding elements, which will not be described.

Described more specifically, the first mounting member 88 is a generally disk-shaped member. A retainer metal member 94 having a generally cup-shaped member is fixed at its open-end portion to an axially lower surface of the first mounting member 88 by welding. A first mounting bolt 96 is secured to the first mounting member 88 so as to protrude from the central portion in the axially upward direction of the engine mount 86. The first mounting member 88 is attached through the first mounting bolt 96 to a power unit of the vehicle (not shown) as the vibration-source-side member, which is superposed on an axially upper surface of the first mounting member 88.

On the other hand, the second mounting member 90 consists of an upper sleeve 98 and a lower sleeve 100 each having a large-diameter cylindrical shape and each being made of a metallic material. The upper sleeve 98 has a shoulder 104 at an axially intermediate portion thereof, and includes a small-diameter portion on the upper side of the shoulder 104 and a large diameter portion on the lower side of the shoulder 104. The small diameter portion of the upper sleeve 98 is slightly bent radially outwardly at its axially upper portion, thereby providing a tapered connecting portion 102 whose diameter is gradually increased in the axially upward direction thereof. The large-diameter portion of the upper sleeve 98 serves as a calking part 106. The lower sleeve 100 has an upper and an lower outward flange 108, 110 integrally formed at its axially upper and lower open end portions. The upper sleeve 98 and the lower sleeve 100 are superposed on each other in the axial direction thereof and connected together such that the calking part 106 of the upper sleeve 98 is calked to the upper outward flange 108 of the lower sleeve 100. Thus, the upper and lower sleeves 98, 100 are superposed and connected to each other in the axial direction thereof, so as to form the second mounting member 90 which has a generally cylindrical shape. The thus formed second mounting member 90 is bolted to a body of the vehicle (not shown) as the subject member at its lower outward flange 110.

The first mounting member 88 is disposed with a suitable axial distance away from the upper open end of the second mounting member 90 and elastically connected with the second mounting member 90 via the elastic body 92 interposed therebetween. The elastic body 92 is a generally frustoconical member. In the process of vulcanization of a rubber material to form the elastic body 92, the elastic body 92 is bonded at its small-diameter end to the first mounting member 88, and at its large-diameter end to the tapered connecting portion 102 of the upper sleeve 98 of the second mounting member 90, thus providing an integral vulcanized assembly consisting of the elastic body 92 and the first and second mounting members 88, 90. The elastic body 92 has a relatively large recess 112 open in its large-diameter end face (lower end face as seen in FIG. 6), so that a tensile stress acting on the elastic body 92 upon installation of the engine mount 86 in position is reduced or prevented. A sealing rubber layer 114 having a relatively small wall thickness is formed on and secured to an substantially entire area of an inner circumferential surface of the upper sleeve 98. The sealing rubber layer 114 may be formed integrally with the elastic body 92.

With the first and second mounting members 88, 90 being elastically connecting with each other as described above, the upper open end of the second mounting member 90 is fluid-tightly closed by the elastic body 92. Within an interior space of the second mounting member 90, a partition member 116 and a flexible diaphragm 118 are disposed at respective axial positions so as to extend in a generally radial direction perpendicular to the axial direction of the engine mount 86.

The flexible diaphragm 118 is made of a flexibly deformable thin annular rubber layer. In the process of vulcanization of a rubber material to form the flexible diaphragm 118, the flexible diaphragm 118 is bonded at its inner peripheral portion to an outer circumferential surface of a connecting member 120 having an inverted cup shape, and at its outer peripheral portion to a support member 122 in the form of a generally annular metallic plate. The flexible diaphragm 118 has a sufficient radial width thereof to provide sufficient slack so that the flexible diaphragm 118 is easily deformed.

The support member 122 is forcedly gripped by and between the upper and lower sleeves 98, 100, so that the flexible diaphragm 118 is supported by the second mounting member 90 at its outer peripheral portion. In this condition, the flexible diaphragm 118 fluid-tightly closes the axially lower open-end portion of the upper sleeve 98. Thus, within the upper sleeve 98, there is formed a liquid chamber as a primary fluid chamber which is fluid-tightly sealed from an external space, which is filled with a non-compressible fluid, and which is formed by and between the elastic body 92 and the flexible diaphragm 118. Further, an air chamber 124 is formed on one of axially opposite sides of the flexible diaphragm 118 which is remote from the liquid chamber, so as to permit displacement or deformation of the flexible diaphragm 118. The air chamber 124 is always held in communication with the atmosphere via a communication hole 125 formed through the lower sleeve 100.

The partition member 116 consists of a closure member 126 and an upper and a lower orifice member 128, 130, which are all made of metallic materials. The closure member 126 has an annular shape and fixedly gripped by and between the upper and lower sleeve 98, 100 at its outer peripheral portion, so that the closure member 126 is supported by the second mounting member 90. The upper and lower orifice members 128, 130 are superposed on the axially lower surface of the closure member 126 in this order in the axial direction of the engine mount 86, and fixedly gripped by and between the upper and lower sleeve 98, 100 at their outer peripheral portions together with the outer peripheral portion of the closure member 126. Thus, the upper and lower orifice members 128, 130 are also supported by the second mounting member 90.

With the partition member 116 assembled with respect to the second mounting member 90 as described above, the liquid chamber formed within the upper sleeve 98 is divided into two chambers, i.e., a pressure-receiving chamber 132 located on the upper side of the partition member 116 and partially defined by the elastic body 92, and an equilibrium chamber 134 located on the lower side of the partition member 116 and partially defined by the flexible diaphragm 118. Upon application of vibrational loads to the engine mount 86, a pressure of the fluid in the pressure-receiving chamber 132 is changed due to the elastic deformation of the elastic body 92, while the volume of the equilibrium chamber is permitted to vary by displacement or deformation of the flexible diaphragm 118.

The closure member 126 and the upper orifice member 128 have respective through holes 136, 138 which are formed at their central portion and which have the same diameter. The upper orifice member 128 further has an upper circumferential groove 140 formed at its outer peripheral portion so as to open in its upper surface. The opening of the upper circumferential groove 140 is fluid-tightly closed by the closure member 126, to thereby form an upper annular fluid passage 142 extending in the circumferential direction thereof. Further, the lower orifice member 130 has a lower circumferential groove 144 so as to open in its upper surface. The opening of the lower circumferential groove 144 is fluid-tightly closed by the upper orifice member 128, to thereby form an lower annular fluid passage 146 extending in the circumferential direction thereof.

The upper annular fluid passage 142 is held in fluid communication with the pressure-receiving chamber 132 through a first communication hole 148 formed through a circumferential portion of the closure member 126, while being held in fluid communication with the lower annular fluid passage 146 through a second communication hole 150 formed through a circumferential portion of a bottom surface of the upper annular fluid passage 142. The first and second communication holes 148, 150 are opposed to each other in the radial direction. Further, the lower annular fluid passage 146 is also held in fluid communication with the equilibrium chamber 134 through a third communication hole 152 formed through a circumferential portion of a bottom surface of the lower annular fluid passage 146. The third communication hole 152 is opposed to the second communication holes 150 in the radial direction, while being substantially aligned with the first communication hole 148 in the axial direction. This arrangement permits that the non-compressible fluid is forced to flow between the pressure-receiving chamber 132 and the equilibrium chamber 134 through the upper and lower annular fluid passages 142, 146, due to a pressure difference between the two chambers 132, 134 upon application of the vibrational load to the engine mount 86. As is understood form the foregoing description, the upper and lower annular fluid passages 142, 146 cooperate to form an orifice passage for fluid communication between the pressure-receiving chamber 132 and the equilibrium chamber 134. In the present embodiment, the orifice passage consists of the upper and lower annular fluid passages 142, 146 is tuned to exhibit a high damping effect with respect to low-frequency vibrations, such as engine shakes, based on resonance of the fluid flowing through the orifice passage.

The engine mount 86 further includes an oscillating member 154 disposed in the radially central portion of the lower orifice member 130. The oscillating member 154 is a generally inverted-cup-shaped metal member having an outer diameter which is smaller than an inner diameter of the lower orifice member 130. The oscillating member 154 and the lower orifice member 130 are disposed in a substantially coaxial relationship with each other, with a radial spacing therebetween. An annular oscillating rubber support 156 is disposed between the oscillating member 154 and the lower orifice member 130 so as to extend in the radial direction. In the process of vulcanization of the oscillating rubber support 156, the oscillating rubber support 156 is bonded at its inner peripheral portion to an outer circumferential surface of the oscillating member 154 and at its outer peripheral portion to an inner circumferential surface of the lower orifice member 130, thus providing an integral vulcanized intermediate assembly consisting of the oscillating member 154, the lower orifice member 130 and the oscillating rubber support 156. The oscillating member 154 is press fitted onto an axially upper end portion of the connecting member 120 which is fixed to the flexible diaphragm 118 so as to extend through the central portion of the flexible diaphragm 118 in the axial direction as described above. It should be noted that the oscillating member 154 and the oscillating rubber support 156 cooperate to serve as an oscillating member in the present embodiment.

With the oscillating member 154 and the oscillating rubber support 156 assembled as described above, the oscillating member 154 and the oscillating rubber support 156 directly faces at their upper surfaces to the pressure-receiving chamber 132 through the through holes 136, 138. In other words, the oscillating member 154 and the oscillating rubber support 156 cooperate to partially define at their upper surfaces the pressure-receiving chamber 132 and at their lower surfaces the equilibrium chamber 134, as seen in FIG. 6. Namely, the oscillating member 154 and the oscillating rubber support 156 cooperate to fluid-tightly separate the pressure-receiving chamber 132 and the equilibrium chamber 134 from each other.

The engine mount 86 further includes a covering member 158 in the form of a large diameter cylindrical member having a bottom, which is disposed axially downward of the second mounting member 90 as seen in FIG. 6. The covering member 158 has an outward flange portion integrally formed at its axially upper open-end portion. The outward flange portion of the covering member 158 is superposed on and bolted to the lower outward flange 110 of the lower sleeve 100 of the second mounting member 90, so that the covering member 158 is fixedly connected to the second mounting member 90. In the interior space of the covering member 158, a damping actuator 160 is disposed such that the cover member 38, i.e., the outer sleeve 14 of the damping actuator 160 is bolted to a cylindrical-cup-shaped connecting sleeve 162 via a spacer 163, while the inner sleeve 12 is fixed to a bottom face of the covering member 158 by means of the bolt portion 28 and the nut 30. The connecting sleeve 162 is forcedly press-fitted into a bore of the connecting member 120. The damping actuator 160 applied in the engine mount 86 is different from the damping actuator 10 of FIG. 1 in the position of the slit 64 formed in the inner sleeve 12. Namely, in the damping actuator 10, the slit 64 is formed in the axially upper portion of the inner sleeve 12 such that the slit 64 extends axially upwardly so as to open in the axially upper end face of the inner sleeve 12. On the other hand, the slit 64 in the damping actuator 160 is formed in the axially lower portion of the inner sleeve 12 such that the slit 64 extends axially downwardly so as to open in the axially lower end face of the inner sleeve 12.

Like the damping actuator 10, the coil 62 of the damping actuator 160 may be energized by application of an alternating or pulsating current, or alternately energized and de-energized, so as to axially oscillate the outer sleeve 14 relative to the inner sleeve 12. The oscillating movement 14 relative to the inner sleeve 12 is transmitted as an oscillating force to the oscillating member 154 via the connecting sleeve 162 and the connecting member 120, so that the oscillating member 154 is displaced or oscillated in the axially upward and downward directions with the elastic deformation of the oscillating rubber support 156. The oscillating of the oscillating member 154 induces a pressure change of the fluid in the pressure-receiving chamber 132 partially defined by the oscillating member 154. The pressure change of the fluid in the pressure-receiving chamber 132 is applied as the oscillating force to the body of the vehicle, whereby the engine mount 86 exhibits an active damping effect with respect to vibration to be damped. In the present embodiment, the engine mount 86 is tuned to exhibit its active damping effect with respect to medium or high frequency vibrations, such as engine idling vibrations or booming noises.

With the engine mount 86 constructed as described above being installed in position, the pressure of the fluid in the pressure-receiving chamber 132 is changed due to the elastic deformation of the elastic body 92, upon application of vibrational loads to the engine mount 86. This generates a pressure difference between the pressure-receiving chamber 132 and the equilibrium chamber 134, thus causing flows of the non-compressible fluid between the two chambers 132, 134 through the orifice passage consisting of the first and second annular fluid passages 142, 146. As a result, the engine mount 86 exhibits a high damping effect based on resonance of the fluid flowing through the orifice passage with respect to low-frequency vibrations such as engine shakes to which the orifice passage is tuned as described above.

In the engine mount 86 constructed as described above, the oscillating member 154 directly faces or defines the pressure-receiving chamber 132, rather than indirectly faces the pressure-receiving chamber 132 though the orifice passage. This arrangement makes it possible to oscillate the oscillating member 154 at a frequency higher than the frequency band to which the orifice passage is tuned, without taking into account a problem of increase in a resistance to flow of the fluid through the orifice passage due to the higher oscillating frequency of the oscillating member 154. Therefore, the engine mount 86 is also capable of control the pressure of the fluid in the pressure-receiving chamber 132 by oscillating the oscillating member 154 at a suitable frequency. In the present embodiment, the oscillating member 154 is controlled to be oscillated at a desired frequency so that the engine mount 86 exhibits high vibration isolating effect with respect to medium or high frequency vibrations such as engine idling vibrations or booming noises.

In this respect, the engine mount 86 employs the damping actuator 160, making it possible to oscillate the oscillating member 154 with a relatively large oscillating force, with high efficiency in terms of power consumption, while ensuring reduced size and weight of the damping actuator 160.

Figure 7:
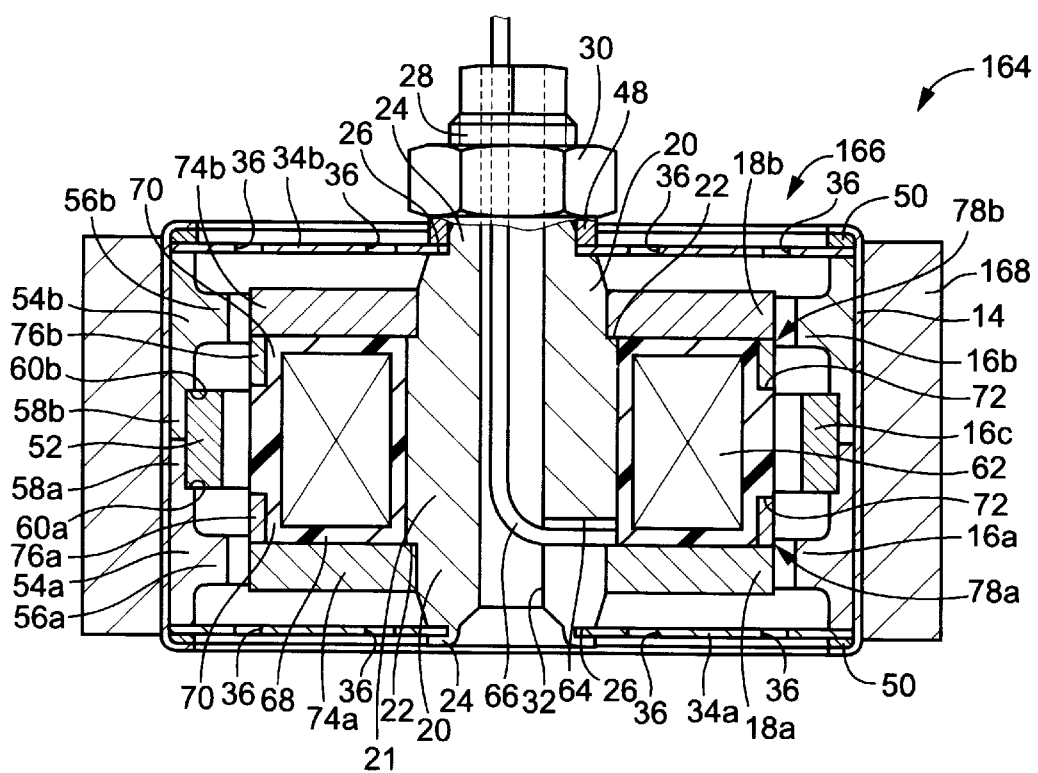
FIG. 7 is an elevational view in axial cross section of an active vibration damper equipped with the damping actuator of FIG. 1.

Referring next to FIG. 7, there will be described an example of application a damping actuator according to the present invention to an active vibration damper 164. The same reference numerals as used in the damping actuator 10 of FIG. 1 are used to identify the functionally corresponding elements, which will not be described.

The active vibration damper 164 includes a damping actuator 166 which is similar in construction with the damping actuator 10 of FIG. 1, and a metallic mass member 168 having a large-diameter cylindrical shape and fixedly mounted on an outer circumferential surface of the outer sleeve 14 of the damping actuator 166. The active vibration damper 164 is installed in position such that the inner sleeve 12 of the damping actuator 166 is fixedly attached to a subject member whose vibration to be damped by means of the bolt portion 28 and the nut 30. It is noted that, unlike the damping actuator 10 of FIG. 1, the damping actuator 166 of the active vibration damper 164 does not includes the cover member 38 and the bolt and nut 44, 46 which are attached to the cover member 38.

In the thus constructed active vibration damper 164, the permanent magnet 52, the outer yoke member 54a, 54b and the mass member168 serve as a mass member of the active vibration damper 164, while the leaf springs 34, 34 serve as an elastic connecting member of the active vibration damper 164. Thus, the mass member and the elastic connecting member constitute a vibration system.

In the active vibration damper 164, the coil 62 may be energized by application of an alternating or pulsating current, or alternately energized and de-energized, so as to axially oscillate the outer sleeve 14 relative to the inner sleeve 12. As a result, the mass member 168 is axially oscillated together with the outer sleeve 14 with respect to the inner sleeve 12 owing to the elastic deformation of the leaf springs 34, 34. In this respect, the energization of the coil 62 is suitably controlled depending upon the frequency, amplitude and phase of the vibration to be damped, so that the active vibration damper 164 can apply an increased oscillating force corresponding to the vibration to be damped to the subject member, based on the oscillating of the mass member 168, thus actively damping or offsetting the vibrations excited in the subject member.

Like the damping actuator 10 of FIG. 1, the use of the damping actuator 166 makes it possible to generate a relatively large oscillating force, with high efficiency in terms of power consumption, while ensuring reduced size and weight of the damping actuator 166.

Figure 8:
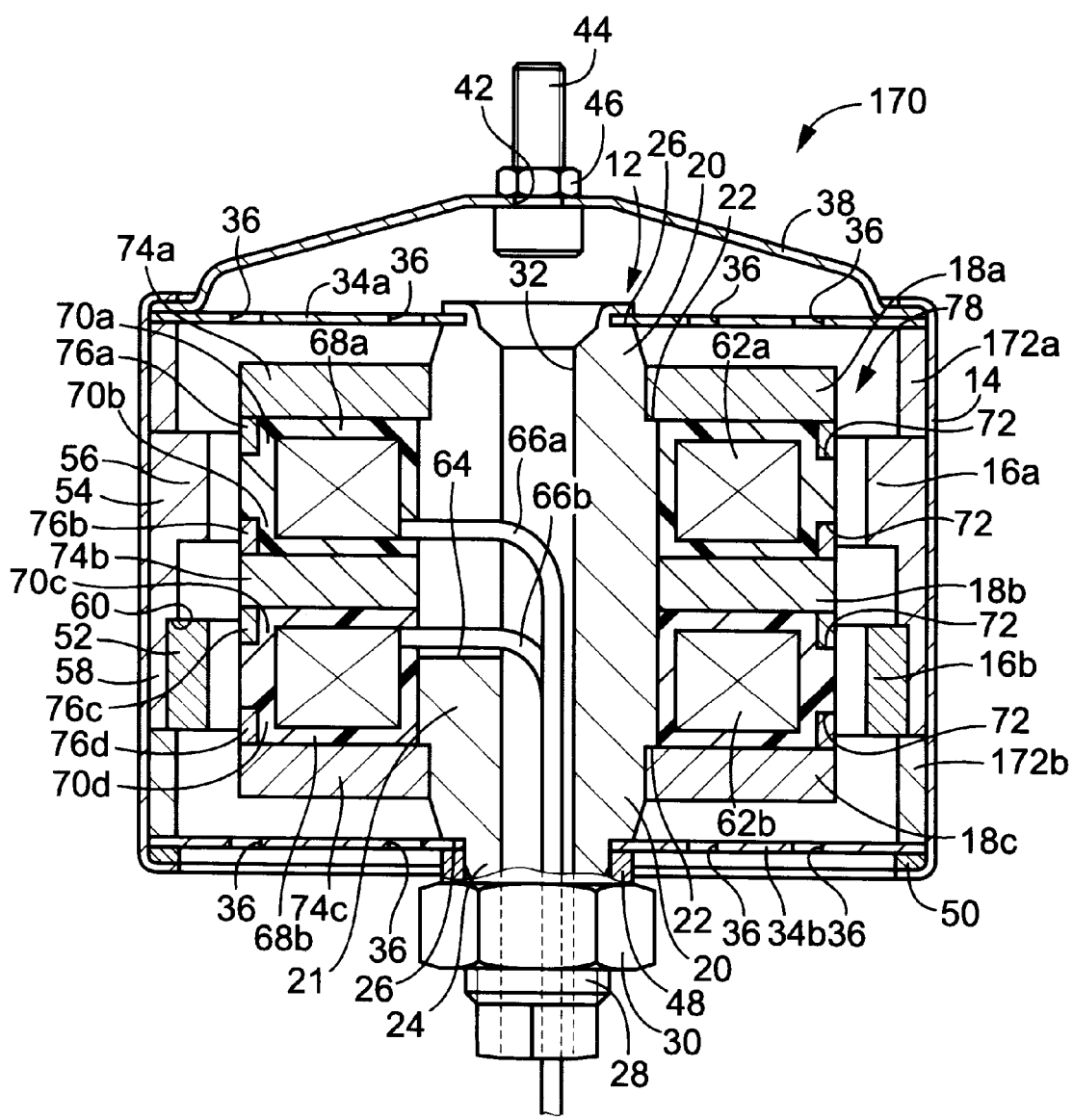
FIG. 8 is an elevational view in longitudinal cross section of a damping actuator constructed according to another preferred form of this invention.

Referring next to FIG. 8, there is shown a damping actuator constructed according to a second embodiment of this invention is shown generally at 170. The damping actuator 170 is different from the damping actuator 10 according to the first embodiment in that the damping actuator 170 employs two coils 62a, 62b, rather than a single coil. In the following description, the same reference numerals as used in the damping actuator 10 of FIG. 1 are used to identify the functionally corresponding elements, which will not be described.

In the damping actuator 170, the outer sleeve 14 fixedly support the cylindrical permanent magnet 52 and the cylindrical outer yoke member 54 which are press fitted into a substantially axially center portion of an inner circumferential surface of the outer sleeve 14.

The outer yoke member 54 has the annular protrusion 56 at its axially upper end portion as seen in FIG. 8. The annular protrusion 56 protrudes radially inwardly and extending continuously in its circumferential direction with an approximately constant cross sectional area. An inside diameter of the outer yoke member 54 is increased at its axially lower end portion as seen in FIG. 8, so as to form the annular fixing recess 58. In the presence of the annular fixing recess 58, the outer yoke member 54 has the stepped surface 60 on the inner circumferential surface. The outer sleeve 14 further fixedly supports upper and lower cylindrical spacers 172a, 172b which are press fitted into axially upper and lower end portions of the inner circumferential surface of the outer sleeve 14, respectively, The outer yoke member 54 is interposed between and fixedly supported by the upper and lower spacers 172a, 172b in the axial direction of the outer sleeve 14, and the permanent magnet 52 is interposed between and fixedly supported by the stepped surface 60 and the lower spacer 172b in the axial direction of the outer sleeve 14. In this condition, the permanent magnet 52 is held in contact at its outer circumferential surface with an inner circumferential surface of the annular fixing recess 58, while being aligned at its inner circumferential surface with a protruding end face of the annular protrusion 56 in the axial direction of the damping actuator 170, as seen in axial cross section. The radially inner end portions of the annular protrusion 56 and the permanent magnet 52 serve as two outer magnetic pole portions 16a, 16b, which are spaced apart from each other in the axial direction of the damping actuator 170.

Figure 9:
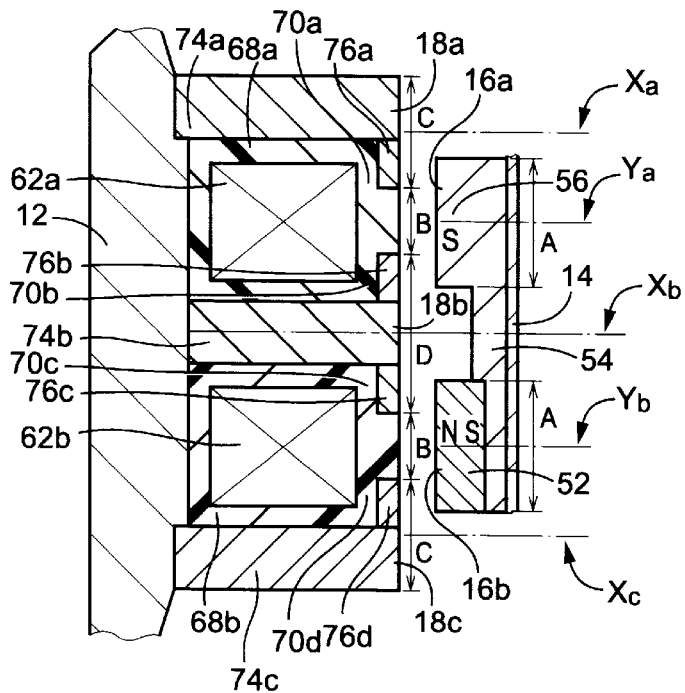
FIG. 9 is a longitudinal cross sectional view schematically illustrating a basic structure of the damping actuator of FIG. 8.

As is apparent from FIG. 9, the permanent magnet 52 is magnetized in the radial direction thereof such that a magnetic pole N is given in the inner circumferential surface thereof, while a magnetic pole S is given in the outer circumferential surface thereof. In this arrangement, the outer yoke member 54 is held in contact with the magnetic pole S of the permanent magnet 54. Therefore, the magnetic pole S is given to the outer magnetic pole portion 16a formed by the annular protrusion 56 of the outer yoke member 54, while the magnetic pole N is given to the outer magnetic portion 16b formed by the inner circumferential portion of the permanent magnet 54.

Upper and lower annular coil 62a, 62b wound in their circumferential direction are disposed radially outwardly on an axially intermediate portion of the inner sleeve 12 with an axial spacing therebetween. The inner sleeve 12 is formed with the slit 64 extending axially upwardly from the axially intermediate portion thereof so as to open in its axially upper end face, as seen in FIG. 8. Lead wires 66a, 66b of the upper and lower coils 62a, 62b are accommodated within the bore 32 of the inner sleeve 12 through the slit 64, so as to extend through the bore 32.

The upper and lower coils 62a, 62b are covered by the electrically insulative bobbins 68a, 68b, respectively. Described in detail, each of the bobbins 68a, 68b are a hollow annular member. The bobbins 68a has fixing portions 70a, 70b at axially opposite end portions of the outer circumferential surface thereof, in which the outer diameter of the bobbin 68a is made smaller than the axially intermediate portion. Likewise, the bobbins 68b has fixing portions 70c, 70d at axially opposite end portions of the outer circumferential surface thereof, in which the outer diameter of the bobbin 68b is made smaller than the axially intermediate portion. In the presence of the two fixing portions 70, two shoulder surfaces 72, 72 are formed on the outer circumferential surface of the each bobbin 68. The thus constructed bobbins 68a, 68b are fixedly mounted on respective axial portions of the inner sleeve 12, so that the coils 62a, 62b are fixedly disposed radially outwardly on the outer circumferential surface of the inner sleeve 12.

The bobbins 68a, 68b fixedly support the first inner yoke members 76a, 76b, 76c, 76d which are fixedly mounted on the fixing portions 70a, 70b, 70c, 70d thereof, respectively. The annular block shaped second inner yoke members 74a, 74c are respectively fixedly mounted on the first cylindrical fixing portions 20, 20 of the inner sleeve 12, while the annular block shaped second inner yoke members 74b is fixedly mounted on an axial central portion of the inner sleeve 12 interposed between the two first cylindrical fixing portions 20, 20. Namely, the second inner yoke member 74a is held in contact at its axially lower end face with axially upper faces of the bobbin 68a and the first inner yoke member 76a, and the second inner yoke member 74b is held in contact at its axially upper end face with axially lower end faces of the bobbin 68a and the first inner yoke member 76b and at its axially lower end face with axially upper end faces of the bobbin 68b and the first inner yoke member 76c, while the second inner yoke member 74c is held in contact with at its axially upper end face with axially lower end faces of the bobbin 68b and the first inner yoke member 76d, as seen in FIG. 8.

In the present embodiment, the second inner yoke members 74a, 74b, 74c and the first inner yoke members 76a, 76b, 76c, 76d as well as the bobbins 68a, 68b are dimensioned to have the same outer diameter. Further, the first and second inner yoke member 76a, 76b, 76c, 76d, 74a, 74b, 74c cooperate to form the inner yoke 78 whose outer circumferential surface serves as the inner magnetic pole portion 18a, 18b, 18c which are located axially opposite sides of the coils 62a, 62b. The inner magnetic pole portions 18a, 18b, 18c are spaced apart from one another in the axial direction of the inner sleeve 12.

In the damping actuator 170 constructed as described above, upon application of an electric current to the coils 62a, 62b through the lead wires 66a, 66b, respectively, magnetic fields are produced and the coils 62a, 62b function as electromagnets, so that the inner magnetic pole portions 18a, 18b, 18c are given magnetic poles depending upon the directions of flows of the electric current through the coils 62a, 62b. In the present embodiment, particularly, the coils 62a, 62b are arranged to be energized by respective electric current whose directions are opposite. Therefore, the magnetic pole given in the inner magnetic pole 18b is opposed to the magnetic poles given in the inner magnetic poles 18a, 18c.

When the coils 62a, 62b are placed in a non-energized state, the inner and outer sleeves 12, 14 is held in a predetermined axial neutral position as shown in FIG. 9, by a holding force including equilibrium of a static magnetic force acting between the inner magnetic pole portions 18a, 18b, 18c and the outer magnetic pole portions 16a, 16b based on a magnetic force of the permanent magnet 52 and a spring force generated by the leaf springs 34a, 34b. It should be appreciated the leaf spring 34a, 34b function as an elastic support member, too in the present embodiment. In this condition, the inner magnetic pole portions 18a, 18b, 18c located on the side of the inner sleeve 12 are opposed in the radial direction to the outer magnetic pole portions 16a, 16b located on the side of the outer sleeve 14, with a predetermined small radial gap therebetween in the radial direction of the inner and outer sleeves 12, 14. Further, the inner magnetic pole portions 18a, 18b, 18c are offset from the outer magnetic pole portions 16a, 16b in the axial direction. There will be described in detail with reference to FIG. 9. When the outer sleeve 14 is placed in a predetermined neutral axial position relative to the inner sleeve 12, as shown in FIG. 9, a centerline Xa perpendicular to the axis of the inner sleeve 12 and passing an axially center point of the inner magnetic pole portion 18a is located axially downwardly of a centerline Ya perpendicular to the axis of the inner sleeve 12 and passing an axially center point of the outer magnetic pole portion 16a. A centerline Xc perpendicular to the axis of the inner sleeve 12 and passing an axially center point of the inner magnetic pole portion 18c is located axially upwardly of a centerline Yb perpendicular to the axis of the inner sleeve 12 and passing an axially center point of the outer magnetic pole portion 16b. In addition, a centerline Xb perpendicular to the axis of the inner sleeve 12 and passing an axially center point of the inner magnetic pole portion 18b is located at axially center point between the outer magnetic pole portions 16a and 16b.

The outer magnetic pole portions 16a, 16b have an axial length "A" that is made larger than an axial distance "B" between the inner magnetic pole portions 18a and 18b and the inner magnetic pole portions 18b and 18c. This arrangement permits that the outer magnetic pole portion 16a overlaps at its axially opposite end portions the axially adjacent inner magnetic pole portions 18a, 18b, while the outer magnetic pole portion 16b overlaps at its opposite end portions the axially adjacent inner magnetic pole portions 18b, 18c, as seen in the radial direction. That is, the outer magnetic pole portion 16a is directly opposite to the inner magnetic pole portions 18a, 18b in the radially direction without being inclined in the axial direction, while the outer magnetic pole portion 16b is directly opposite to the inner magnetic pole portions 18b, 18c in the radial direction without being inclined in the axial direction. Further, the inner magnetic pole portions 18a, 18c are dimensioned to have an axial length "C" which is substantially equal to the axial length "A" of the outer magnetic pole portions 16a, 16b, while the inner magnetic pole portions 18b is dimensioned to have an axial length "D" which is larger than the axial length "C" of the inner magnetic pole portions 18a, 18c.

There will next be described an operation of the present damping actuator 170 constructed as described above. When the coils 62a, 62b are placed in a non-energized state, the inner magnetic pole portions 18a, 18b, 18c are not given magnetic poles, and the inner sleeve 12 and the outer sleeve 14 are held in the predetermined neutral axial position of FIG. 9 by the holding, e.g., by equilibrium of a magnetic force acting between the outer magnetic pole portions 16a, 16b and the inner magnetic pole portions 18a, 18b, 18c based on the opposite magnetic poles S and N given to the outer magnetic pole portions 16a, 16b, respectively, by the permanent magnet 52. If the equilibrium is lost due to a relative axial movement of the inner sleeve 12 and the outer sleeve 14 from the neutral position while the coils 62a, 62b are in the non-energized state, the inner sleeve 12 and the outer sleeve 14 are returned to the neutral position for restoring the equilibrium. That is, a magnetic axial oscillating force is applied between the inner and outer sleeves 12, 14 for restoring the equilibrium and the neutral position thereof. When an amount of the relative axial movement of the inner and outer sleeves 12, 14 exceeds a predetermined value, the inner and outer sleeves 12, 14 may not be returned to their neutral position by the first magnetic force indicated above. Like the damping actuator 10 of FIG. 1, such an excessive amount of relative axial movement of the inner and outer sleeves 12, 14 is prevented by a stop mechanism in the form of the pair of leaf springs 34a, 34b in the present damping actuator 10, assuring high stability of returning of the inner and outer sleeves 12, 14 to their neutral position by the first magnetic forces based on the magnetic poles S and N of the outer magnetic pole portions 16a, 16b.

Figure 10:
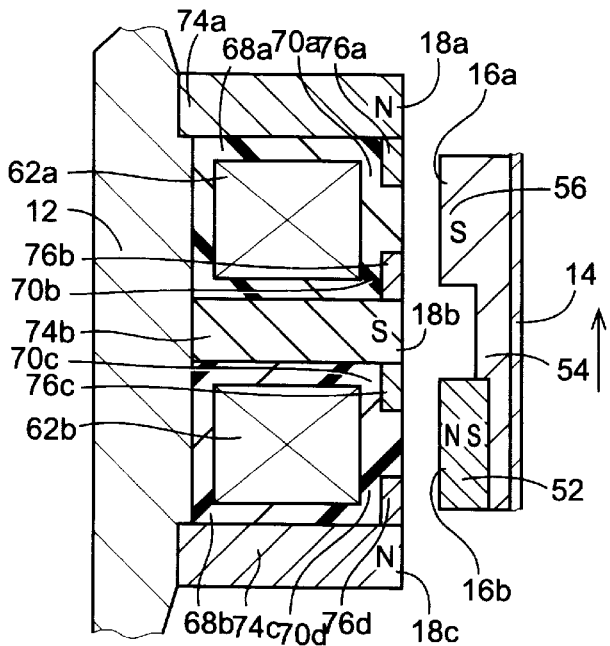
FIG. 10 is a longitudinal cross sectional view for explaining one operating state of the damping actuator of FIG. 8.

When the coils 62a, 62b are energized, each of the coils 62a, 62b functions as an electromagnet. In the present embodiment, the coils 62a, 62b are energized in the opposite directions, e.g., a first and a second direction at the same time. When the coil 62a is energized in the first direction and the coil 62b is energized in the second direction, the inner magnetic pole portions 18a, 18c are given a magnetic pole N while the inner magnetic pole portion 18b is given magnetic pole S, as indicated in FIG. 10 by way of example. As a result, the equilibrium of the magnetic force is lost, so that the inner and outer sleeve 12, 14 are moved relative to each other by the magnetic axial driving force for restoring the equilibrium. More specifically, the outer sleeve 14 is moved relative to the inner sleeve 12 in the axially upward direction as indicated by an arrow in FIG. 10, by the magnetic axial driving force consist of the repellent forces acting between the same magnetic poles and the attractive forces acting between the opposite magnetic poles.

Figure 11:
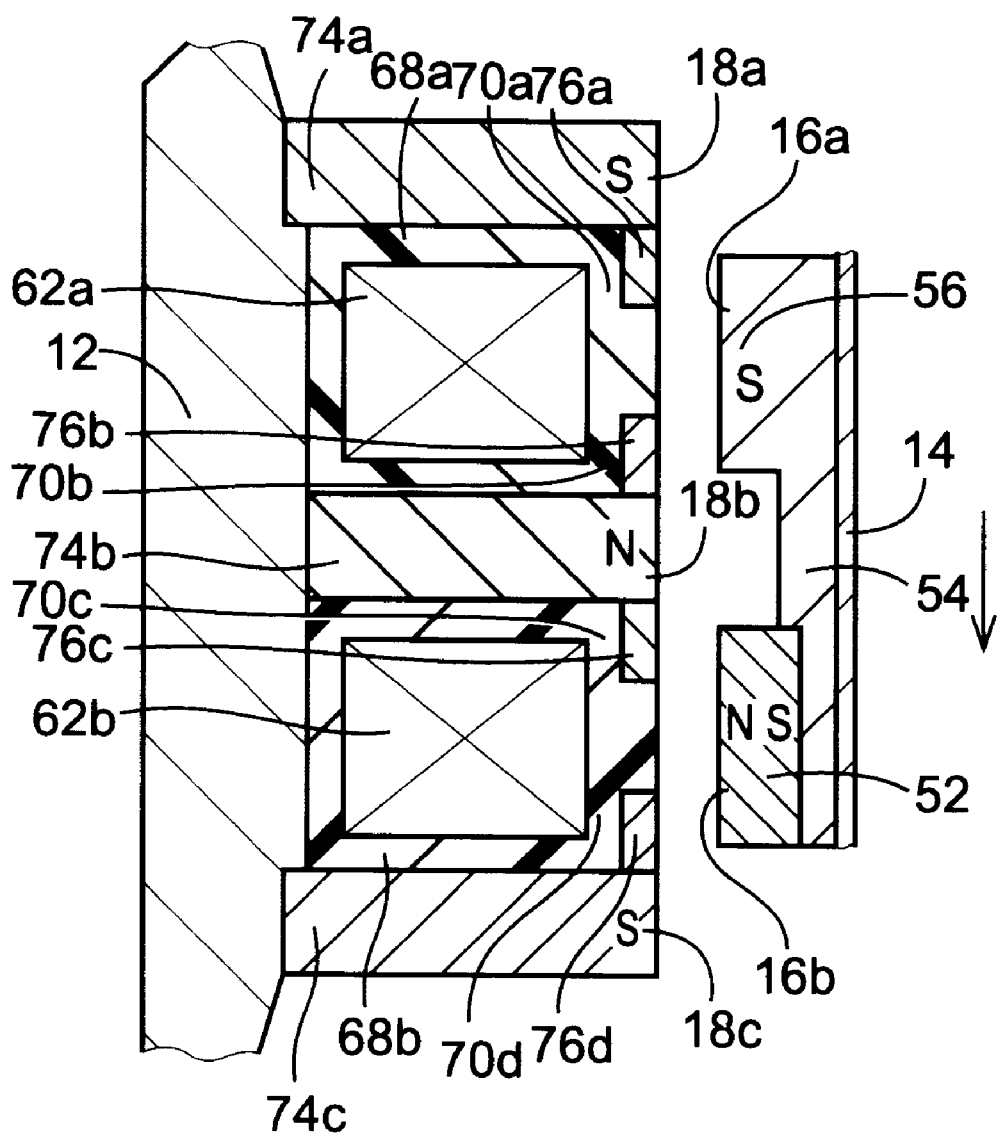
FIG. 11 is a longitudinal cross sectional view for explaining another operating state of the damping actuator of FIG. 8.

When the, directions of energization of the coil 62a, 62b are reversed, namely, the coil 62a is energized in the second direction and the coil 62b is energized in the first direction, the inner magnetic poles of the energized coils 62a, 62b functioning as the electromagnets are reversed. Described in detail, the inner magnetic pole portions 18a, 18c are given a magnetic pole S while the inner magnetic pole portion 18b is given magnetic pole N, as indicated in FIG. 11, by way of example. As a result, the outer sleeve 14 is moved relative to the inner sleeve 12 in an axially downward direction as indicated by an arrow in FIG. 11, by the magnetic axial driving force consist of the repellent forces acting between the same magnetic poles and the attractive forces acting between the opposite magnetic poles, given in the inner and outer magnetic pole portions 18a, 18b, 18c, 16a, 16b.

In the damping actuator 170 constructed according to the present embodiment, the coils 62a, 62b may be energized by application of an alternating or pulsating current or alternately energized and de-energized, so as to axially oscillate the outer sleeve 14 relative to the inner sleeve 12.

The damping actuator 170 constructed as described above enjoys the technical advantages explained above with respect to the damping actuator 10 of FIG. 1. Further, the damping actuator 170 is capable of exhibiting an increased oscillating force based on the overall magnetic forces acting between the inner magnetic pole portions 18a, 18b disposed on the axially opposite sides of the coil 62a and the outer magnetic pole portion 16a, and the inner magnetic pole portions 18b, 18c disposed on the axially opposite sides of the coil 62b and the outer magnetic pole portions 16b.

In the damping actuator 170 constructed as described above, the outer yoke member 54 and the permanent magnet 52 are disposed radially outwardly of the two coils 62a, 62b so as to extend in the axial direction over the two coils 62a, 62b. Further, the outer magnetic pole portions 16a is positioned to be located in axially intermediate portion between the inner magnetic pole portions 18a and 18b of the coil 62a, while the outer magnetic pole portions 16b is positioned to be located in axially intermediate portion between the inner magnetic pole portions 18c and 18d of the coil 62b. This enable the damping actuator 170 to effectively generate the large axial oscillating force with a reduced number of outer magnetic pole portions 16a, 16b.

Like the damping actuator 10 of FIG. 1, the damping actuator 170 may be applicable to various kinds of vibration devices including: the active damping oscillator 80, the engine mount 86, the active vibration damper (164), and the like.

Figure 12:
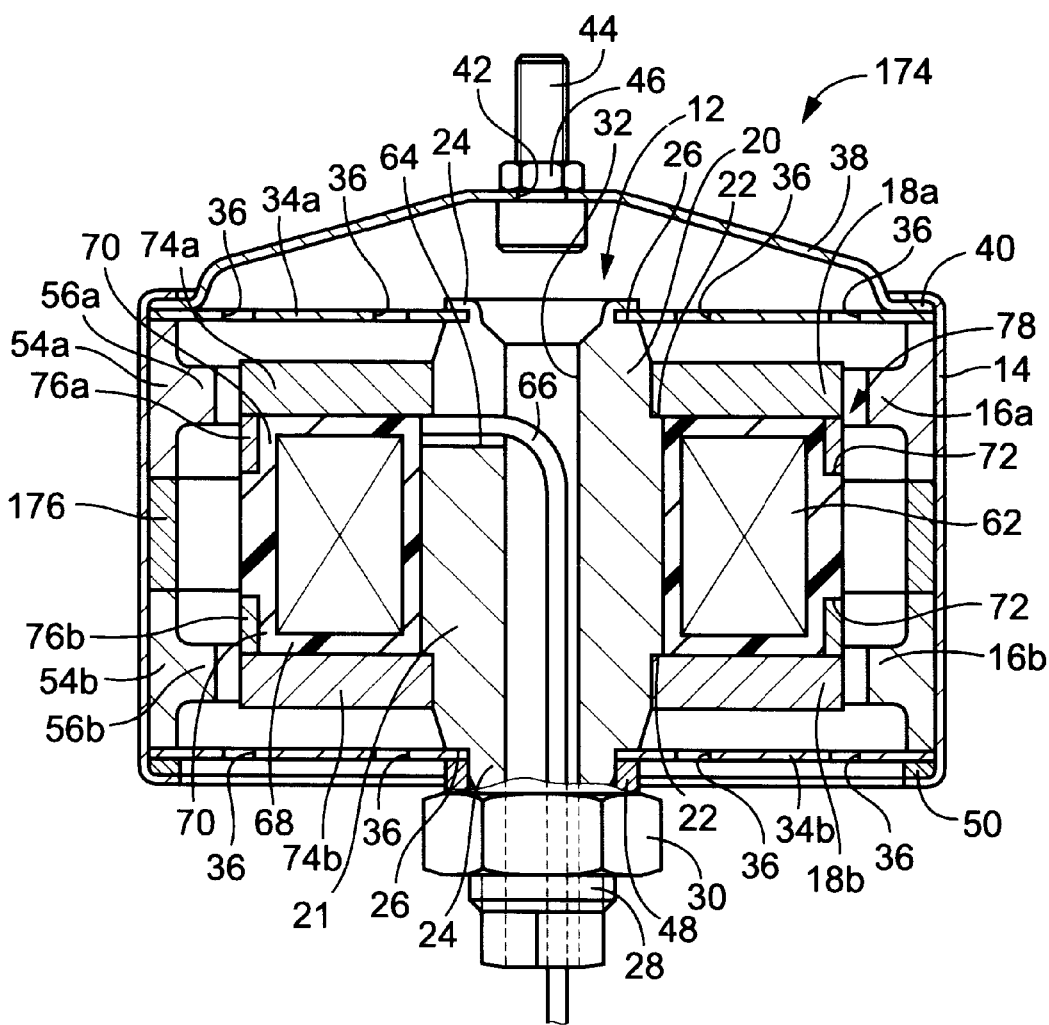
FIG. 12 is an elevational view in longitudinal cross section of a damping actuator constructed according to yet another preferred form of this invention.

Referring next to FIG. 12, there will be described a damping actuator 174 constructed according to a third embodiment of the present invention. The same reference numerals as used in the damping actuator 10 of FIG. 1 are used to identify the functionally corresponding elements, which will not be described to avoid redundant explanation.

Unlike the damping actuator 10 of FIG. 1, the damping actuator 174 employs an annular permanent magnet 176 which is magnetized in an axial direction thereof, which will be described later. Like the damping actuator 10 of FIG. 1, the outer sleeve 14 fixedly supports the permanent magnet 176 disposed at its axially central portion and the pair of cylindrical outer yoke members 54a, 54b disposed at its axially opposite sides, respectively. In this condition, the permanent magnet 176 is held in abutting contact at its axially opposite end faces with the outer yoke members 54a, 54b, respectively, and is compressed by and between the outer yoke members 54a, 54b.

The outer yoke members 54a, 54b have respective annular protrusions 56a, 56b at their axially intermediate portions such that the annular protrusions 56a, 56b protrude radially inwardly and extend continuously in its circumferential direction with an approximately constant cross sectional area. The wall thickness of the permanent magnet 176 is made similar to the wall thickness of the axially opposite end portions of the outer yoke members 54a, 54b. Therefore, the protruding end portions of the annular protrusions 56a, 56b serve as the outer magnetic pole portions 16a, 16b which are spaced from each other in the axial direction. Like the damping actuator 10 of FIG. 1, the annular protrusions 56a, 56b of the outer yoke memerrs 54a, 54b are dimensioned to have the axial length "C" which is made smaller than the axial length "A" of the inner yoke members 18a, 18b, and are directly opposite to the inner yoke members 18a, 18b in the axial direction as seen in FIG. 13 where the coil 62 is in a non-energized state.

Figure 13:
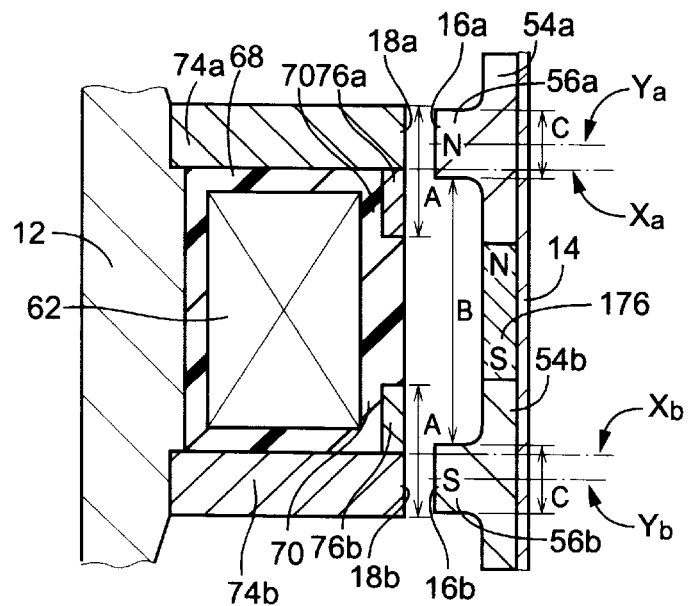
FIG. 13 is a longitudinal cross sectional view schematically illustrating a basic structure of the damping actuator of FIG. 12.

As shown in FIG. 13, the permanent magnet 176 is magnetized in the axial direction thereof such that a magnetic pole N is given in the inner circumferential surface, while a magnetic pole S is given in the outer circumferential surface. In this arrangement, the outer yoke member 54a is held in contact with the magnetic pole N of the permanent magnet 176. Therefore, the magnetic pole N is given to the outer magnetic pole portion 16a formed by the annular protrusion 56a of the outer yoke member 54a. On the other hand, the outer yoke member 54b is held in contact with the magnetic pole S of the permanent magnet 176. Therefore, the magnetic pole S is given to the outer magnetic pole portions 16b formed by the annular protrusions 56b of the outer yoke member 54b.

When the coil 62 is placed in a non-energized state, the inner and outer sleeves 12, 14 is held in a predetermined axial neutral position as shown in FIG. 13, by a holding force including equilibrium of a static magnetic force acting between the inner magnetic pole portions 18a, 18b and the outer magnetic pole portions 16a, 16b based on a magnetic force of the permanent magnet 52 and a spring force generated by the leaf springs 34a, 34b, like the damping actuator 10 of FIG. 1. In this condition, the inner magnetic pole portions 18a, 18b located on the side of the inner sleeve 12 are opposed in the radial direction to the outer magnetic pole portions 16a, 16b located on the side of the outer sleeve 14, with a predetermined small radial gap therebetween in the radial direction of the inner and outer sleeves 12, 14. Further, the inner magnetic pole portions 18a, 18b are offset from the outer magnetic pole portions 16a, 16b in the axial direction. There will be described in detail with reference to FIG. 13. When the inner sleeve 12 is placed in a predetermined neutral axial position relative to the outer sleeve 14, as shown in FIG. 13, a centerline Xa perpendicular to the axis of the inner sleeve 12 and passing an axially center point of the inner magnetic pole portion 18a is located axially downwardly of a centerline Ya perpendicular to the axis of the inner sleeve 12 and passing an axially center point of the outer magnetic pole portion 16a. On the other hand, a centerline Xb perpendicular to the axis of the inner sleeve 12 and passing an axially center point of the inner magnetic pole portion 18b is located axially upwardly of a centerline Yb perpendicular to the axis of the inner sleeve 12 and passing an axially center point of the outer magnetic pole portion 16b. In addition, the inner magnetic pole portions 18a, 18b have an axial length "A" which is smaller than an axial distance "B" between the outer magnetic pole portions 16a, 16b, and which is larger than an axial length "C" of the outer magnetic pole portions 16a, 16b. Accordingly, the inner magnetic pole portions 18a, 18b are directly opposed to the outer magnetic pole portions 16a, 16b without being inclined with respect to the axial direction of the inner sleeve 12.

There will next be described an operation of the present damping actuator 174 constructed as described above. When the coil 62 is placed in the non-energized state, the inner magnetic pole portions 18a, 18b are not given magnetic poles, and the inner sleeve 12 and the outer sleeve 14 are held in the predetermined neutral axial position of FIG. 13 by the holding force, e.g., by equilibrium of the magnetic force acting between the outer magnetic pole portions 16a, 16b and the inner magnetic pole portions 18a, 18b based on the opposite magnetic poles N and S given to the outer magnetic pole portions 16a, 16b by the permanent magnet 176. If the equilibrium is lost due to a relative axial movement of the inner sleeve 12 and the outer sleeve 14 from the neutral position while the coil 62 is in the non-energized state, the inner sleeve 12 and the outer sleeve 14 are returned to the neutral position for restoring the equilibrium. That is, the magnetic axial oscillating force is applied between the inner and outer sleeves 12, 14 for restoring the equilibrium and the neutral position thereof.

Figure 14:
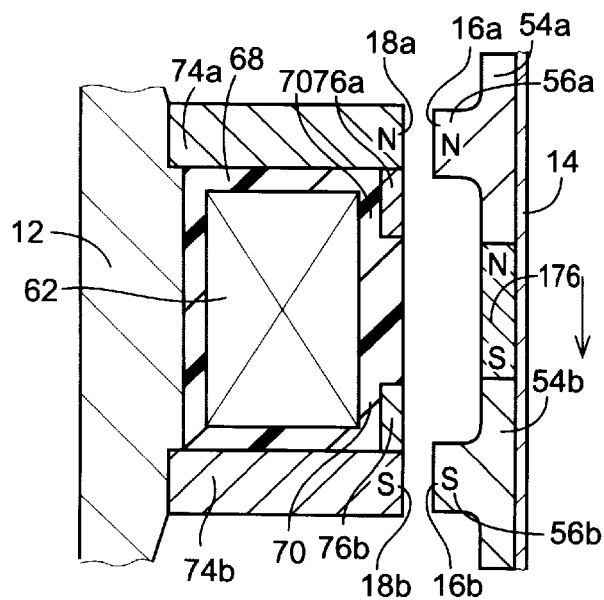
FIG. 14 is a longitudinal cross sectional view for explaining one operating state of the damping actuator of FIG. 12.

When the coil 62 is energized, it functions as an electromagnet. In the present embodiment, the coil 62 is energized in the opposite directions. When the coil 62 is energized in one direction, the inner magnetic pole portion 18a is given a magnetic pole N while the inner magnetic pole portion 18b is given magnetic pole S, as indicated in FIG. 14 by way of example. As a result, the equilibrium of the static magnetic force is lost, so that the inner and outer sleeve 12, 14 are moved relative to each other by the magnetic axial driving force for restoring the equilibrium. More specifically, the outer sleeve 14 is moved relative to the inner sleeve 12 in the axially downward direction as indicated by an arrow in FIG. 14 by the magnetic axial driving force consist of the repellent forces acting between the same magnetic poles and the attractive forces acting between the opposite magnetic poles.

Figure 15:
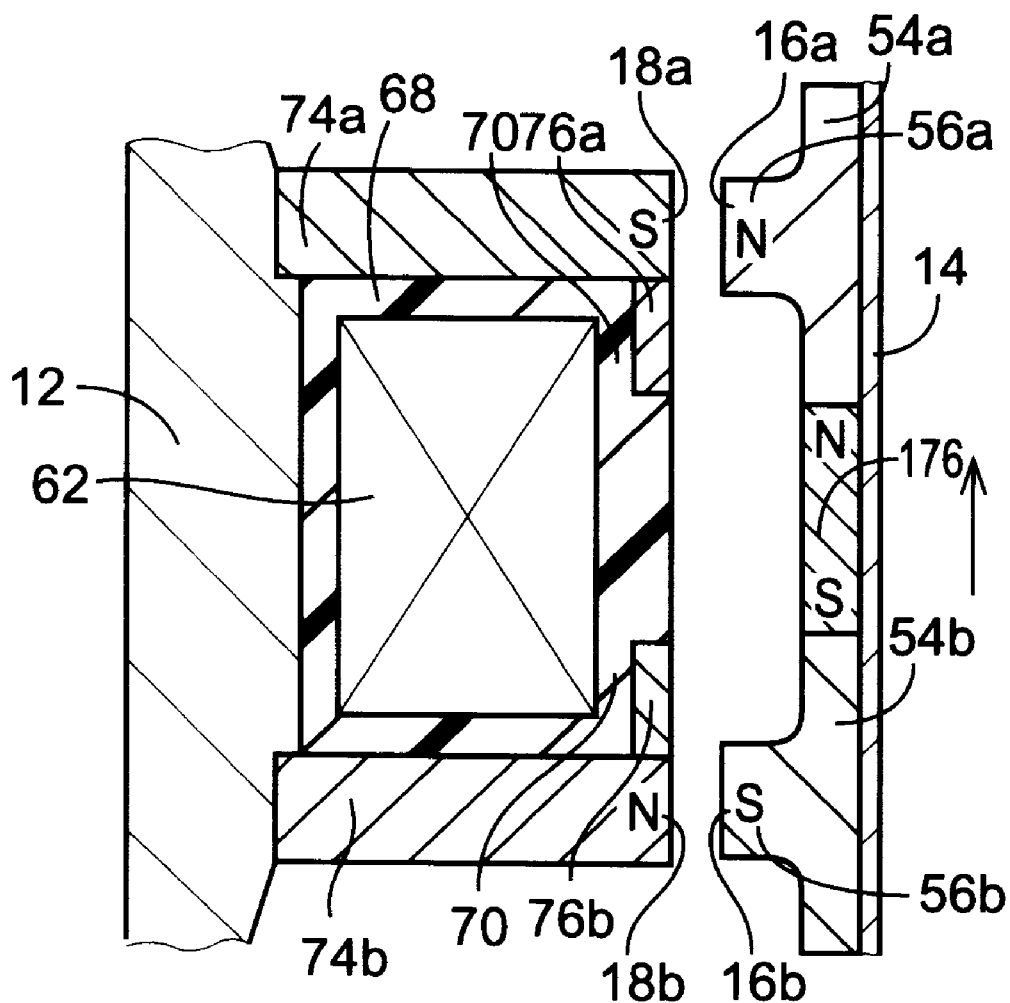
FIG. 15 is a longitudinal cross sectional view for explaining another operating state of the damping actuator of FIG. 12.

When the direction of energization of the coil 62 is reversed, the magnetic poles of the energized coil functioning as an electromagnet are reversed, namely, the inner magnetic pole portion 18a is given a magnetic pole S while the inner magnetic pole portion 18b is given magnetic pole N, as indicated in FIG. 15, by way of example. As a result, the outer sleeve 14 is moved relative to the inner sleeve 12 in an axially upward direction as indicated by an arrow in FIG. 15, by the magnetic axial driving force consist of the repellent forces acting between the same magnetic poles and the attractive forces acting between the opposite magnetic poles.

In the damping actuator 174 constructed according to the present embodiment, the coil 62 may be energized by application of an alternating or pulsating current or alternately energized and de-energized, so as to axially oscillate the outer sleeve 14 relative to the inner sleeve 12.

The damping actuator 174 constructed as described above enjoys the technical advantages explained above with respect to the damping actuator 10 of FIG. 1. Like the damping actuator 10 of FIG. 1, the damping actuator 174 is applicable to various kinds of active vibration damping devices such as the active damping oscillator 80, the engine mount 86, the active vibration damper 164, or the like.

While the presently preferred embodiments of this invention have been described in detail, for illustrative purpose only, it is to be understood that the present invention is not limited to the details of the illustrated embodiments, but may be otherwise embodied.

For instance, while the leaf springs 34, 34 are employed for constituting a guide mechanism in the illustrated embodiments, the guide mechanism is not particularly limited to the leaf springs 34, 34 but may otherwise be embodied by utilizing a rubber elastic body or the like, depending upon required damping characteristics.

In the illustrated embodiment, the inner and outer sleeves 12, 14 is elastically held in the predetermined axial neutral position by utilizing spring forces of the leaf springs 34a, 34b as an elastic support member. Such an elastic support member is not essential to practice the present invention. It may be possible to move the inner and outer sleeves 12, 14 within a predetermined axial distance by only magnetic forces acting between the inner and outer sleeves 12, 14 rather than by means of the illustrated stop mechanism. In this case, however, the damping actuator preferably includes a guide mechanism interposed between the inner shaft member and the outer sleeve member so as to permit a relative axial movement of the inner shaft member and the outer sleeve member while preventing a relative radial movement thereof, as disclosed in JP-A-11-351322, for example.

It is to be understood that the present invention may be embodied with various other changes, modifications and improvements, which may occur to those skilled in the art without depending from the spirit and scope of the invention defined by the following claims.

What is claimed is:

1. A damping actuator comprising:
an inner shaft member;
an outer sleeve member disposed coaxially with and radially outwardly of said inner shaft member with a radial spacing therebetween such that said outer sleeve member being movable relative to said inner shaft member;
a coil disposed coaxially with and fixedly mounted on said inner shaft member;
an inner yoke fixedly disposed on said coil so as to form at an outer circumferential portion thereof a plurality of inner magnetic pole portions located in axially opposite sides of said coil, said plurality of inner magnetic pole portions being given magnetic poles upon energization of said coil;
a permanent magnet disposed radially outwardly of said coil and/or said inner yoke with a radial spacing therebetween and fixedly mounted in said outer sleeve member in a coaxial relation with each other so as to extend in a circumferential direction of said outer sleeve member; and an outer yoke fixedly disposed on said permanent magnet and associated with said permanent magnet to form a plurality of outer magnetic pole portions, said plurality of outer magnetic pole portions being given magnetic poles by said permanent magnet, said inner magnetic pole portions and said outer magnetic pole portions are opposed to each other in a radial direction perpendicular to an axial direction of said inner shaft member with a predetermined radial gap therebetween, and are offset from each other in said axial direction, while said coil is in a non-energized state, said coil being energized for generating a magnetic axial driving force between said inner and outer magnetic pole portions so that said inner and outer magnetic pole portions are moved relative to each other in said axial direction.

2. A damping actuator according to claim 1, wherein said permanent magnet has a magnetic pole N at one of an inner and an outer circumferential surface thereof and a magnetic pole S at an other one of said inner and outer circumferential surfaces thereof.

3. A damping actuator according to claim 1, wherein said permanent magnet has a magnetic pole N at one of axially opposite end faces thereof and a magnetic pole S at an other one of said axially opposite end faces thereof.

4. A damping actuator according to claim 1, wherein said inner shaft member and said outer sleeve member are held in a predetermined axial neutral position based on equilibrium of a magnetic force acting between said inner magnetic pole portions and said outer magnetic pole portions by said permanent magnet, while said coil is in a non-energized state.

5. A damping actuator according to claim 4, further comprising an elastic support member adapted to cooperate with said equilibrium of said magnetic force to hold said inner shaft member and said outer sleeve member in said predetermined axial neutral position.

6. A damping actuator according to claim 1, further comprising a metallic leaf spring which is disposed on at least one of axially opposite sides of said inner shaft member so as to elastically connect said inner shaft member and said outer sleeve member with each other.

7. A damping actuator according to claim 1, further comprising a stop mechanism for defining a maximum amount of relative axial movement of said inner shaft member and said outer sleeve member from a predetermined neutral axial position, so as to permit said inner shaft member and said outer sleeve member to be returned to said neutral axial position after said maximum amount of relative axial movement.

8. A damping actuator according to claim 1, wherein said inner magnetic pole portions located in axially opposite sides of said coil are opposed to said outer magnetic pole portions in said radial direction, respectively, each of said inner magnetic pole portions has an axial length larger than an axial length of each of said outer magnetic pole portions, and each of said inner magnetic pole portions has an axially center point located axially inwardly of an axially center point of a corresponding one of said outer magnetic pole portions, while said coil is in said non-energized state.

9. A damping actuator according to claim 1, wherein at least one of said outer magnetic pole portions is located in axially intermediate position between said inner magnetic pole portions located in axially opposite sides of said coil and is given one of opposite magnetic poles N and S, and others of said outer magnetic pole portions are opposed in said radial direction to and offset in said axial direction from said inner magnetic pole portions, respectively, and are given an other one of said opposite magnetic poles N and S, while said coil is in said non-energized state.

10. A damping actuator according to claim 9, wherein each of said inner magnetic pole portions has an axial length, which is substantially equal to an axial length of said one of said outer magnetic pole portions and which is larger than an axial length of said others of said outer magnetic pole portions, each of said inner magnetic pole portions has an axially center point located axially inwardly of an axially center point of a corresponding one of said others of said outer magnetic pole portions, while said coil is in said non-energized state.

11. A damping actuator according to claim 1, wherein said coil comprises a plurality of coils which are spaced apart from each other in said axial direction of said inner shaft member with a predetermined axial spacing therebetween.

12. A damping actuator according to claim 11, wherein said outer yoke is disposed radially outwardly of said plurality of coils so as to extend in said axial direction over at least two of said plurality of coils, said outer yoke having two outer magnetic pole portions which are given respective magnetic poles N and S and opposed in said radial direction to said at least two of said plurality of coils, respectively, each of said two outer magnetic pole portions being located in an axially intermediate portion between said inner magnetic pole portions located in axially opposite side of a corresponding one of said at least two of said plurality of coils, while said coil is in said non-energized state.

13. A damping actuator according to claim 12, wherein each of said two outer magnetic pole portions has an axial length which is larger than an axial distance between said inner magnetic pole portions of said corresponding coil so that said each of said two outer magnetic pole portions overlap at axially opposite end portions thereof with said inner magnetic pole portions as seen in said radial direction, while said coil is in said non-energized state.

14. A damping actuator according to claim 1, wherein said inner shaft member is formed with a bore extending in said axial direction thereof for accommodating a lead wire through which an electric current is applied to said coil.

15. A damping actuator according to claim 1, further comprising a guide mechanism interposed between said inner shaft member and said outer sleeve member, so as to permit a relative axial movement of said inner shaft member and said outer sleeve member while preventing a relative radial movement thereof.

* * * * *